(12) United States Patent
Gupta et al.

(10) Patent No.: US 10,972,311 B2
(45) Date of Patent: Apr. 6, 2021

(54) UPDATES TO SUPPORT NETWORK BASED INTERNET PROTOCOL FLOW MOBILITY

(71) Applicant: INTEL IP CORPORATION, Santa Clara, CA (US)

(72) Inventors: Vivek Gupta, San Jose, CA (US); Puneet K. Jain, Hillsboro, OR (US); Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 28 days.

(21) Appl. No.: 16/420,434

(22) Filed: May 23, 2019

(65) Prior Publication Data

US 2019/0349219 A1 Nov. 14, 2019

Related U.S. Application Data

(63) Continuation of application No. 14/581,803, filed on Dec. 23, 2014.

(Continued)

(51) Int. Cl.
*H04L 12/64* (2006.01)
*H04W 28/02* (2009.01)
(Continued)

(52) U.S. Cl.
CPC ...... *H04L 12/6418* (2013.01); *H04L 12/4633* (2013.01); *H04L 45/38* (2013.01);
(Continued)

(58) Field of Classification Search
CPC . H04L 12/6418; H04L 12/4633; H04L 45/38; H04W 76/16; H04W 28/0263;
(Continued)

(56) References Cited

U.S. PATENT DOCUMENTS 9,585,054 B2 * 2/2017 Ahmad ............. H04W 28/0215
9,807,644 B2 * 10/2017 Ma ..................... H04W 28/0268
(Continued)

FOREIGN PATENT DOCUMENTS

CN 103636257 A 3/2014

OTHER PUBLICATIONS

3GPP TR 23.861.V1.7.0 (Nov. 2012) Technical Report; "3rd Generation Partnership Projects; Technical Specification Group Services and Systems Aspects; Network Based IP flow mobility (Release 12)"; Nov. 2012 (Nov. 2012). URL: http://www.3gpp.org/ftp/Specs/archive/23_series/23.861/23861-170.zip.
(Continued)

*Primary Examiner* — Christopher R Crompton
(74) *Attorney, Agent, or Firm* — Kacvinsky Daisak Bluni PLLC

(57) ABSTRACT

Various embodiments may be generally directed to techniques for UE initiated and network initiated IP flow mobility. Various embodiments provide techniques for sharing IP flow routing rules and/or filters between a UE and various network infrastructure components using existing network based protocols or extensions thereto. Various embodiments provide techniques for provisioning network based IP flow mobility triggers and for ensuring UE connections to a 3GPP network are maintained in the absence of any 3GPP network IP flows.

22 Claims, 13 Drawing Sheets

Related U.S. Application Data

(60) Provisional application No. 61/990,609, filed on May 8, 2014.

(51) Int. Cl.
| | | |
|---|---|---|
| *H04L 12/721* | (2013.01) | |
| *H04W 76/16* | (2018.01) | |
| *H04W 36/00* | (2009.01) | |
| *H04W 40/24* | (2009.01) | |
| *H04L 12/46* | (2006.01) | |
| *H04W 40/36* | (2009.01) | |
| *H04W 80/04* | (2009.01) | |
| *H04W 88/16* | (2009.01) | |
| *H04W 36/18* | (2009.01) | |
| *H04W 36/14* | (2009.01) | |
| *H04W 84/12* | (2009.01) | |
| *H04W 88/06* | (2009.01) | |

(52) U.S. Cl.
CPC ... *H04W 28/0263* (2013.01); *H04W 36/0027* (2013.01); *H04W 40/248* (2013.01); *H04W 40/36* (2013.01); *H04W 76/16* (2018.02); *H04W 36/14* (2013.01); *H04W 36/18* (2013.01); *H04W 80/04* (2013.01); *H04W 84/12* (2013.01); *H04W 88/06* (2013.01); *H04W 88/16* (2013.01)

(58) Field of Classification Search
CPC ........... H04W 36/0027; H04W 40/248; H04W 40/36; H04W 36/14; H04W 36/18; H04W 80/04; H04W 84/12; H04W 88/06; H04W 88/16

USPC ........................................................ 370/329
See application file for complete search history.

(56) References Cited

U.S. PATENT DOCUMENTS

| | | | | |
|---|---|---|---|---|
| 9,973,966 | B2* | 5/2018 | Karampatsis | H04W 72/1242 |
| 2011/0275359 | A1* | 11/2011 | Sebire | H04W 76/15 |
| | | | | 455/422.1 |
| 2012/0087345 | A1* | 4/2012 | Yan | H04W 36/0033 |
| | | | | 370/331 |
| 2012/0113968 | A1* | 5/2012 | Zhou | H04W 60/00 |
| | | | | 370/338 |
| 2013/0044608 | A1 | 2/2013 | Qiang et al. | |
| 2014/0321328 | A1* | 10/2014 | Zuniga | H04W 8/24 |
| | | | | 370/254 |

OTHER PUBLICATIONS

3GPP TS 24.244 V121.0 (Apr. 2014); Technical Specification; "3rd Generation Partnership Project; Technical Specification Group Core Network and Terminals; Wireless LAN control plane protocol for trusted WLAN access to EPC; Stage 3 (Release 12)"; Apr. 2014 (Apr. 2014) URL: http://www.3gpp.org/ftp/Specs/archive24_series/24.244/24244-110.zip.

Author Unknown, "UE initiated PDN connectivity request procedure in WLAN on S2a for Multi-Connection Mode" 3GPP SA WG2 Meeting #100, S2-134282, Nov. 15, 2013.

\* cited by examiner

| | WLCP Flow Mobility Request : Message from UE to TWAG | | | | |
|---|---|---|---|---|---|
| IEI *802* | Information Element *804* | Type/Reference *806* | Presence *808* | Format *810* | Length *812* |
| | Flow Mobility Request message identity | Message Type | M | V | |
| | Procedure transaction identity | Transaction identifier | M | V | |
| | Access point name | Access point name | M | TLV | |
| | PDN connection ID | PDN connection ID | M | TLV | |
| 27 | Protocol configuration options | Protocol configuration options | O | TLV | |

| | WLCP Flow Mobility Response : Message from TWAG to UE | | | | |
|---|---|---|---|---|---|
| IEI *902* | Information Element *904* | Type/Reference *906* | Presence *908* | Format *910* | Length *912* |
| | Flow Mobility Response message identity | Message Type | M | V | |
| | Procedure transaction identity | Transaction identifier | M | V | |
| 27 | Protocol configuration options | Protocol configuration options | O | TLV | |

| | WLCP Flow Mobility Indication : Message from TWAG to UE | | | | |
|---|---|---|---|---|---|
| IEI *1002* | Information Element *1004* | Type/Reference *1006* | Presence *1008* | Format *1010* | Length *1012* |
| | Flow Mobility Indication message identity | Message Type | M | V | |
| | Procedure transaction identity | Transaction identifier | M | V | |
| | Access point name | Access point name | M | TLV | |
| | PDN connection ID | PDN connection ID | M | TLV | |
| 27 | Protocol configuration options | Protocol configuration options | O | TLV | |

| WLCP Flow Mobility Accept : Message from UE to TWAG ||||||
|---|---|---|---|---|---|
| IEI *1102* | Information Element *1104* | Type/Reference *1106* | Presence *1108* | Format *1110* | Length *1112* |
| | Flow Mobility Response message identity | Message Type | M | V | |
| | Procedure transaction identity | Transaction identifier | M | V | |
| 27 | Protocol configuration options | Protocol configuration options | O | TLV | |

# UPDATES TO SUPPORT NETWORK BASED INTERNET PROTOCOL FLOW MOBILITY

RELATED CASE

This application is a continuation of, claims the benefit of and priority to previously filed U.S. patent application Ser. No. 14/581,803, filed Dec. 23, 2014, entitled "UPDATES TO SUPPORT NETWORK BASED INTERNET PROTOCOL FLOW MOBILITY", which claims the benefit of and priority to U.S. Provisional Patent Application No. 61/990,609, filed May 8, 2014, which are hereby incorporated by reference in their entireties.

This application related to International Patent Application entitled "UPDATES TO SUPPORT NETWORK BASED INTERNET PROTOCOL FLOW MOBILITY", filed Apr. 8, 2015. The contents of the aforementioned application are incorporated herein by reference.

TECHNICAL FIELD

Embodiments herein generally relate to communications between devices in broadband communications networks and the seamless offloading of data traffic between different broadband wireless communications networks.

BACKGROUND

In an evolved Universal Mobile Telecommunications System Terrestrial Radio Access Network (E-UTRAN), a user equipment (UE) may be simultaneously connected to a 3GPP wireless network access system and a non-3GPP wireless network system (e.g., a local area network). Internet protocol (IP) flows associated with the UE can be moved between the 3GPP and non-3GPP wireless networks using protocols such as Dual Stack Mobile Internet Protocol v6 (DSMIPv6). However, DSMIPv6 is a client based protocol that is inflexible and so not widely deployed across 3GPP wireless networks.

BRIEF DESCRIPTION OF THE DRAWINGS

FIG. 8 illustrates an embodiment of a format of a first message.

FIG. 9 illustrates an embodiment of a format of a second message.

FIG. 10 illustrates an embodiment of a format of a third message.

FIG. 11 illustrates an embodiment of a format of a fourth message.

DETAILED DESCRIPTION

Figure 1:
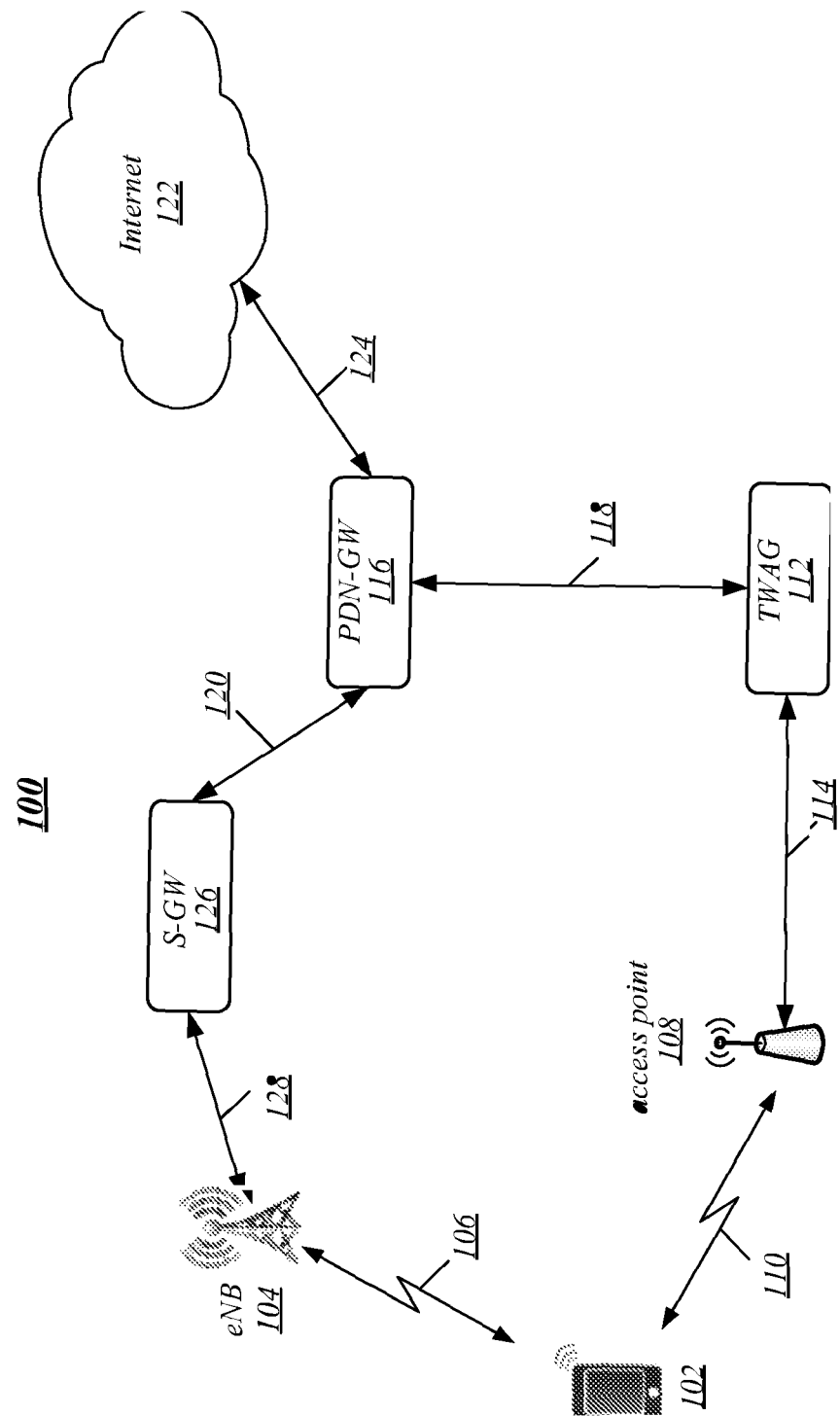
FIG. 1 illustrates an embodiment of a first operating environment.

A network based IP flow mobility protocol is needed that can support seamless IP flow offloading using network based protocols, such that both UE initiated and network initiated IP flow mobility are available.

Various embodiments may be generally directed to techniques for UE initiated and network initiated IP flow mobility. Various embodiments provide techniques for sharing IP flow routing rules and/or filters between a UE and various network infrastructure components using existing network based protocols or extensions thereto. Various embodiments provide techniques for provisioning network based IP flow mobility triggers and for ensuring UE connections to a 3GPP network are maintained in the absence of any 3GPP network IP flows.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA), High Speed Packet Access (HSPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency Wireless Local Area Network (WLAN) (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of some embodiments in which techniques for IP flow mobility may be implemented. The operating environment 100 can include a mobile device 102, a cellular base station 104, a local area network (LAN) access point 108, a packet data network gateway (PDN-GW) 116, a serving gateway (S-GW) 126, and a trusted wireless access gateway (TWAG) 112.

As shown in FIG. 1, the mobile device 102 can communicate with the base station 104 over a wireless communications interface 106 and with the access point 108 over a wireless communication interface 110. The mobile device 102 can be a smartphone, tablet, laptop, netbook, or other mobile computing device capable of communicating wirelessly with one or more wireless communication networks. As an example, the mobile device 102 can be a user equipment (UE). The base station 104 can be a cellular base station such as, for example, an evolved node B (eNB). The access point 108 can provide wireless communications over a local area. The access point 108 can be, for example, a Wi-Fi access point. The wireless communications interface 106 can be, for example, a 3GPP wireless network interface and the eNB 104 can provide the mobile device 102 with connectivity to a 3GPP wireless access network. The wireless communications interface 110 can be, for example, a Wi-Fi wireless network interface and the access point 108 can provide the mobile device 102 with connectivity to a Wi-Fi wireless access network.

The base station 104 can be connected to the internet 122 or a backbone communications network through the S-GW 126 and the PDN-GW 116. The base station 104 can be connected to the S-GW 126 over a communications link 128. The communications link 128 can be a wired communications link. The communications link 128 can be, for example, an S1-U communications link or interface. The S-GW 126 can be connected to the PDN-GW 116 over a communications link 120. The communications link 120 can be a wired communications link. The communications link 120 can be, for example, an S5 communications link or interface. The PDN-GW 116 can be connected to the internet 122 or the backbone communications network over a communications link 124. The communications link 124 can be a wired communications link. Communications over the communications link 124 can be packet based. The communications link 124 and the internet 122 can together be considered as providing external communications over a packet data network (PDN).

The access point 108 can be connected to the internet 122 or the backbone communications network through the TWAG 112. The TWAG 112 can provide access to a trusted wireless access network (TWAN). The access point 108 can be connected to the TWAG 112 over a communications link 114. The communications link 114 can be a wired communications link. The TWAG 112 can be connected to the PDN-GW 116 over a communications link 118. The communications link 118 can be a wired communications link. The communications link 118 can be an S2a communications link. Alternatively, the access point 108 can be connected to an evolved packet data gateway (ePDG) which is in turn connected to the PDN-GW 116 over an S2b communications link. Under this alternative, the ePDG can provide the mobile device 102 with access to an untrusted wireless local area access network. The techniques described herein are applicable to both a TWAN served by a TWAG and to an untrusted WLAN served by a ePDG. For purposes of illustration only, the figures and descriptions may focus on a TWAG/TWAN but they are not so limited as the generation, transmission, reception and processing of any message or any operation or configuration of the TWAN/TWAG is similarly applicable to an operating environment involving an untrusted WLAN/ePDG. Further, the techniques described herein for adding non-3GPP network access to a multi-access PDN connection are not limited to TWANs but can involve adding access to an untrusted WLAN to a multi-access PDN. As such, the techniques described herein allow the provision of trusted and untrusted WLAN connections and 3GPP connections to a multi-access PDN connection and the movement of IP flows among trusted and untrusted WLAN connections and 3GPP connections.

The network elements depicted in FIG. 1 can operate to provide access to a packet switch network. As an example, the network elements depicted in FIG. 1 can operate in accordance with the Evolved Packet Core (EPC). The EPC is an Internet Protocol (IP) packet switched core network that allows internetworking between 3GPPP technologies (e.g., GSM, GPRS, WCDMA, HSPA, and LTE) and non-3GPP technologies (e.g., WiMAX and Wi-Fi). While the base station 104 can provide the mobile device 102 with access to a 3GPP wireless network and the access point 108 can provide the mobile device with access to a non-3GPP wireless network, EPC allows for IP data traffic to be managed in a similar manner regardless of which wireless access technology (e.g., 3GPP or non-3GPP) the mobile device 102 uses to connect to the internet 122. The PDN-GW 116 can be considered to be an anchor point for providing mobility between the 3GPP wireless network and the non-3GPP wireless network. The TWAG 112 can be considered as providing EPC access to a TWAN available through the access point 108.

The mobile device 102 can be capable of providing multiple, simultaneous services. The services can include applications using internet data connections. For example, the mobile device 102 can be capable of simultaneously providing an internet browsing service (for example, through a HyperText Transfer Protocol (HTTP) connection), a non-conversational video stream service, and a voice over IP (VoIP) stream service. Each internet data connection/service can be considered to be an IP flow. An IP flow can be provided to the mobile device 102 from the internet 122 by way of the base station 104 or by way of the access point 108.

IP flows provided through the base station 104 can be provided to the mobile device 102 by way of a 3GPP wireless network access system. IP flows provided through the access point 108 can be provided by way of a non-3GPP wireless network access system. Regardless of the IP flow being provided through a 3GPP or a non-3GPP wireless network access system, the IP flow can be routed through PDN-GW 116. An IP flow provided to the mobile device 102 can be considered to be associated with the PDN-GW 116. Similarly, IP flows routed through the PDN-GW 116 can be considered to be associated with a particular end user device, such as, for example, the mobile device 102.

IP flows can be moved from one wireless network access system to another. As an example, an IP flow can be moved from being provided over a 3GPP wireless network access system (e.g., through communications between the mobile device 102 and the base station 104) to being provided over a non-3GPP wireless network access system (e.g., through communications between the mobile device 102 and the access point 108). Similarly, an IP flow can be moved from being provided over a non-3GPP wireless network access system (e.g., through communications between the mobile device 102 and the access point 108) to being provided over a 3GPP wireless network access system (e.g., through communications between the mobile device 102 and the base station 104). Moving an IP flow from a first wireless network access system to a second wireless network access system can be initiated by the mobile device 102 or by a network component of the wireless access system such as, for example, the PDN-GW 116. The movement of an IP flow from a first wireless network access system to a second wireless network access system can be referred to as IP flow mobility.

Disclosed herein are techniques for IP flow mobility including IP flow mobility initiated by the mobile device 102 or initiated by a network component or infrastructure component of a wireless network access system. Further disclosed herein are techniques for network based IP flow mobility (NBIFOM) providing for the management, initiation and execution of IP flow mobility using network-based protocols. By using network-based protocols, IP flow mobility can be initiated by the mobile device 102 or a network component or infrastructure component with IP flow mobility occurring within the core inter-network that supports the first and second wireless network access systems. The IP flow techniques disclosed herein can enable service continuity as the mobile device 102 moves between different areas of a 3GPP wireless network and different locally-provided non-3GPP wireless networks and can enable the mobile device 102 to move an existing IP flow between different wireless network access systems with no disruption in service.

The distribution of IP flows across different available wireless network access systems can be based on policies and/or rules provisioned by the core network, the mobile device 102, or the operator of a network. When both 3GPP and non-3GPP access is available, the IP flow rules can be used to set default rules on the type of access to provide to a particular type of flow (e.g., video streaming IP flows by default are to be moved to a Wi-Fi network when available).

The IP flow rules can guide the distribution of flows, including triggers for initiating IP flow movements, based on the characteristics of the flows (e.g., quality of service (QoS) requirements), user or network operator preferences, user application preferences (e.g., access preferences), and/or the capabilities of the available accesses such as, for example, network congestion or a mobility event (e.g., movement of the mobile device 102 away from available non-3GPP access). Disclosed herein are techniques for provisioning IP flow rules and operating in accordance therewith to provide seamless internet data connections to the mobile device 102.

Routing rules can include specification of a routing filter and/or a routing access type. A routing filter can include IP header parameter value or ranges that can identify one more IP flows. A routing access type can identify the particular access network (e.g., 3GPP or WLAN) over which a particular IP flow is to be routed. Accordingly, a routing rule can specify which type of IP flow is to be provided over each type of access. A routing rule can also include conditions, parameters, or preferences for moving a specific IP flow or a particular type of IP flow.

As an example of IP flow mobility implemented in accordance with techniques disclosed herein, a user of the mobile device 102 can initially be connected to only a first wireless network access system provided by communicating with the base station 104. The mobile device 102 can be provided with a video stream IP flow and an email data connection IP flow simultaneously. The mobile device 102 can then come into close proximity with the access point 108. The access point 108 can provide the mobile device 102 with connectivity to a second wireless network access system. The second wireless network system can be, for example, a Wi-Fi network. The Wi-Fi network may provide connectivity to the internet 122 for no cost to the user. Further, the Wi-Fi network may, for a particular period of time, provide a higher bandwidth and a better QoS connection than the first wireless network access system. As a result, and based on IP flow rules (or routing rules), the video stream IP flow may be moved from the first wireless network access system to the Wi-Fi network. The video stream IP flow can be routed through the PDN-GW 116, thereby assuring a seamless IP flow mobility change from the perspective of the user of the mobile device 102. The PDN-GW 116 therefore can operate as a multiple access (multi-access) PDN as the IP flows are provided through a single PDN connection that provide access to both a 3GPP and a non-3GPP network. The email data connection IP flow can remain or continue to be provided through the first wireless network access system. At a later time, for example, when the Wi-Fi network becomes available (e.g., the mobile device 102 moves out of a coverage area provided by the access point 108), the video stream IP flow can be moved back to the first wireless network access system.

Disclosed herein are techniques for IP flows to be moved between a first wireless communication access system to a second wireless communication access system. In particular, in accordance with certain techniques one or more IP flows can be moved from a 3GPP wireless access communications network to a non-3GPP wireless access communications network. Further, in accordance with certain techniques one or more IP flows can be moved from a non-3GPP wireless access communications network to a 3GPP wireless access communications network. The 3GPP wireless access communications network can be a long term evolution (LTE) network. The non-3GPP wireless access communications network can be a Wi-Fi network.

Techniques disclosed herein provide extensions to communications protocols used by the mobile device 102 and the TWAG 112 to communicate and extensions to communications protocols used by the TWAG 112 and the PDN-GW 116 to communicate to effectuate IP flow mobility between a 3GPP wireless network access system and a non-3GPP wireless network access system. Techniques disclosed herein enable an IP flow to be moved from a 3GPP wireless access system to a non-3GPP wireless access system and enable an IP flow to be moved from a non-3GPP wireless access system to a 3GPP wireless access system. Extensions to a Wireless Link Control Protocol (WLCP) disclosed herein can be used to provide communications between the UE 102 and the TWAG 112 and can provide a basis to facilitate IP flow mobility. Extensions to a general radio packet service (GPRS) tunneling protocol (GTP) Tunneling Protocol general packet radio service (GPRS) can be used to provide communications between the TWAG 112 and the PDN-GW 116 and can provide a basis to facilitate IP flow mobility. The embodiments are not limited to these example techniques.

Figure 2:
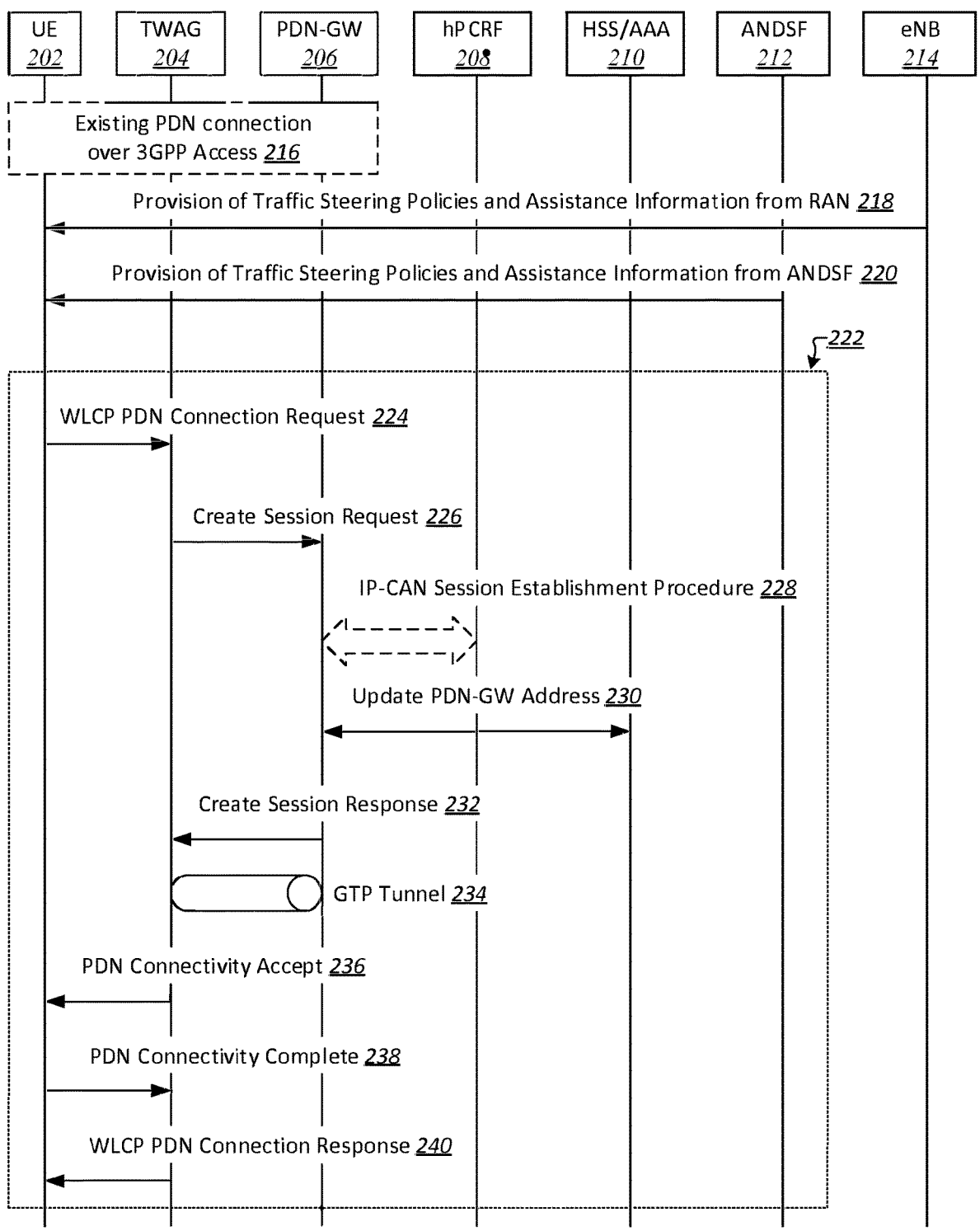
FIG. 2 illustrates an embodiment of a first message flow.

FIG. 2 illustrates one embodiment of a message flow 200, which may be representative of the operations executed by one or more embodiments described herein. The message flow 200 illustrates exemplary messages exchanged between multiple network elements. As shown in FIG. 2, the message flow 200 illustrates communications between a UE 202, a TWAG 204, a PDN-GW 204, a home policy and charging rules function (hPCRF) 208, a home subscriber server (HSS) with authentication, authorization, and accounting (AAA) functionality 210, an access network discovery and select function (ANDSF) 212, and an eNB 214.

The message flow 200 can include a UE initiated message flow 222 for adding access to a non-3GPP wireless communications network. The message flow 222 can include steps or operations implemented by one or more network components or devices to enable the UE 202 to add a connection to a non-3GPP wireless network, for example, a Wi-Fi network. Operational steps 216, 218, and 220 can proceed the message flow 222. At step 216, the UE 202 is connected to a 3GPP wireless network access system. As such, the UE 202 can have an internet connection through the PDN-GW 206 through the 3GPP network. The message flow 222 can subsequently be used or implemented to add a non-3GPP connection through the PDN-GW 206 for the UE 202. At step 218, the UE 202 can retrieve rules and/or policies for steering data traffic from the radio access network (RAN) by communicating with the eNB 214. Alternatively or in addition thereto, at step 220, the UE 202 can retrieve rules and/or policies for steering data traffic from the ANDSF 212. The UE 202 and ANDSF can communicated over an s14 interface. The rules and/or policies for steering data traffic can provide the UE 202 with rules for managing IP flows including for example, determining how different IP flows are to be distributed between the 3GPP and non-3GPP networks. Such rules and/or policies can specify the type of wireless access to be used for particular types of IP flows (e.g., all video IP flows are to be routed through non-3GPP wireless access when such access is available). The rules and/or policies can be based on, for example, user preferences, network configurations, data traffic conditions, QoS requirements, signal strength, and bandwidth availability.

The message flow 222 can begin at step 224 with the UE 202 generating a WLCP PDN connection request message. The WLCP PDN connection request message can be transmitted by the UE 202 and received by the TWAG 204. The WLCP PDN connection request message can indicate that access to an available non-3GPP wireless network (recognized and/or identified by the UE 202) is to be added to the existing PDN-GW 206 connection as opposed to creating a separate, new connection to the PDN-GW 206. The indication can specify that the existing PDN-GW 206 connection is to be provisioned as a multiple access PDN connection by adding a WLAN as an additional access connection. This indication can be made by setting a request type field of the WLCP PDN connection request message 224 to specify use of the existing PDN-GW 206 connection. In an embodiment, the request type field can be set to IP flow mobility or to alternative value or setting indicating the same. Accordingly, the TWAG 206 interprets the WLCP PDN connection request message from the UE 202 as an indication that the UE 202 is attempting to initiate access to the non-3GPP network through the existing PDN-GW 206 connection (by provision the connection to be a multi-access PDN connection) already being used to provide internet connectivity through the 3GPP network.

The WLCP PDN connection request message can include an updated routing rule. The updated routing rule can specify the handling of one or more IP flows. For example, an updated routing rule can specify under what circumstances a particular type of IP flow is to be routed from a first wireless network access system to a second wireless network access system. The updated routing rule can be included in a protocol configurations options (PCO) filed of the WLCP PDN connection request message. Alternatively, the updated routing rule can be added directly to the WLCP PDN connection request message. The UE 202 can specify the updated routing rule as a new routing rule. The UE 202 can specify the updated routing rule as a modified routing rule. A modified routing rule can adjust the routing access type (e.g., 3GPP or non-3GPP network routing) of an existing routing rule. As an example, a modified routing rule can specify the routing of certain data traffic (e.g., identified by a flow identifier (FID)) through a particular access (identified by a binding indicator (BID)). Further, an updated routing rule can simply remove an existing routing rule. In the case of a new routing rule, the UE 202 can specify a new FID mobility option. Additionally, the UE 202 can include a new routing filter description in the WLCP PDN connection request message.

At step 226, the TWAG 204 generates a create session request message 226. The create session request message can included the updated routing rule specified by the UE 202. The TWAG can transmit the create session request message to the PDN-GW 206. As such, the updated routing rule can be provided to the PDN-GW 206. The updated routing rule can be included in the PCO of the create session request message. The create session request message can be provided to the PDN-GW 206 using GTP.

At step 228, the PDN-GW 206 can interact with the hPCRF 208. In particular, the PDN-GW 206 can initiate an IP connectivity access network (IP-CAN) session establishment procedure. At step 230, the PDN-GW 206 and the HSS/AAA 210 can communicate to update the PDN-GW address. At step 232, the PDN-GW 206 can generate a create session response message and can transmit the message to the TWAG 204. At step 234, a GTP tunnel can be established between the TWAG 204 and the PDN-GW 206. At step 236, the TWAG 204 can generate and transmit a PDN connectivity accept message. At step 238, the UE 202 can generate and transmit a PDN connectivity complete message.

At step 240, the TWAG 204 can generate a WLCP PDN connection response. The WLCP PDN connection response message 240 can indicate that the requested non-3GPP wireless access is available over the existing PDN-GW 206 connection (over a multi-access PDN connection). The WLCP PDN connection response message 240 can include the update routing rule requested by the UE 202 in the WLCP PDN connection request message provided in step 224 as a confirmation that the updated routing rule was accepted, for example, by the PDN-GW 206 to enable subsequent IP flow movements. The updated routing rule can be added to a PCO field of the WLCP PDN connection response message. Alternatively, the updated routing rule can be added directly to the WLCP PDN connection response message.

At the end of logic flow/message flow 222, the UE 202 can have 3GPP and non-3GPP wireless network access through the same, previously existing PDN-GW 206 connection (e.g., thereby creating a multi-access PDN connection). The message flow 222 can also be implemented to add 3GPP access to an existing PDN connection. For example, the UE 202 can have only non-3GPP access prior to initiating message flow 222. Message flow 222 can subsequently be implemented to add a 3GPP network connection to the PDN-GW 206.

Figure 3:
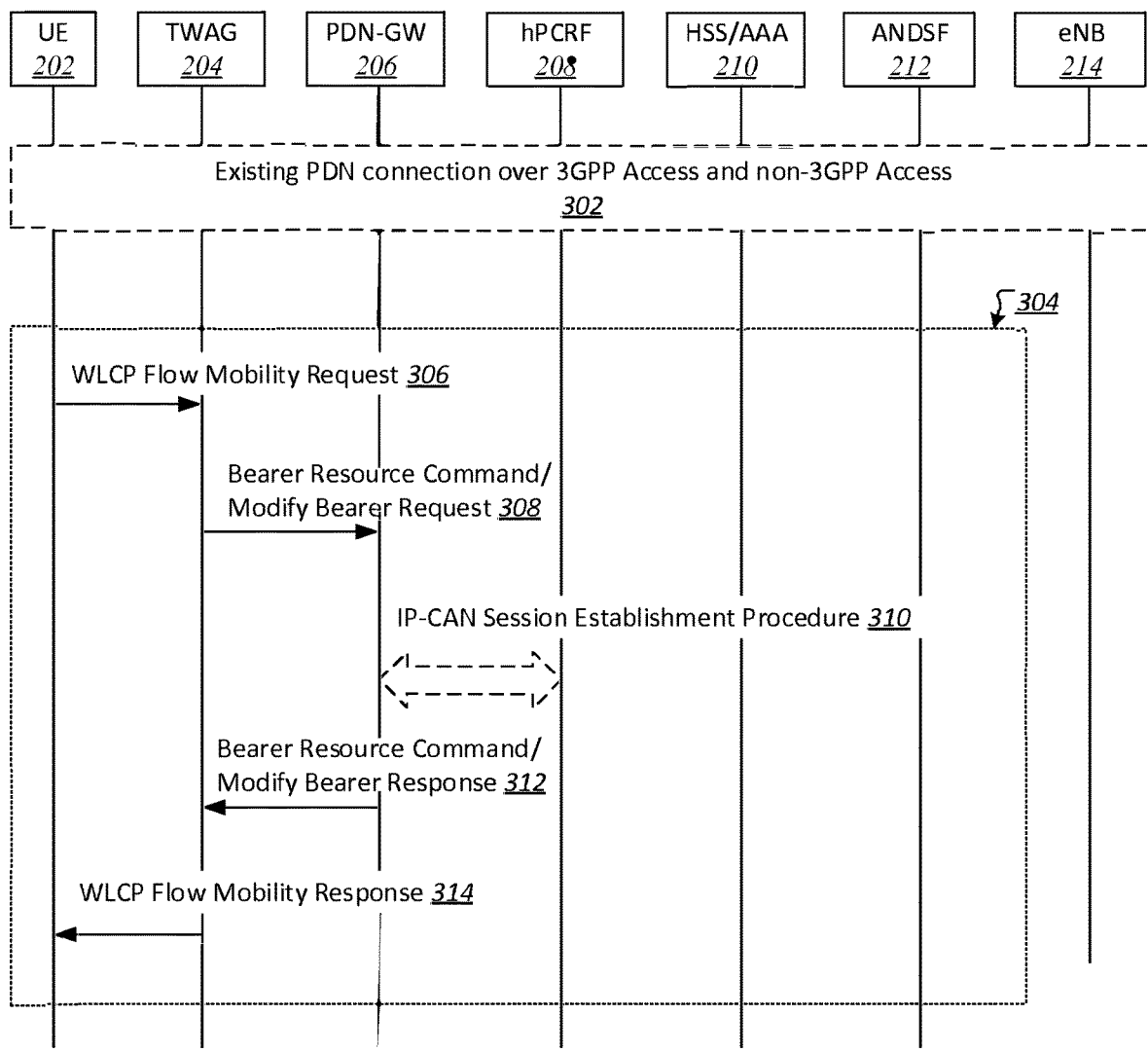
FIG. 3 illustrates an embodiment of a second message flow.

FIG. 3 illustrates one embodiment of a message flow 300, which may be representative of the operations executed by one or more embodiments described herein. The message flow 300 illustrates exemplary messages exchanged between multiple network elements. As shown in FIG. 3, the message flow 300 illustrates communications between the UE 202, the TWAG 204, the PDN-GW 204, the hPCRF 208, the HSS/AAA, the ANDSF 212, and the eNB 214.

The message flow 300 can include a UE initiated message flow 304 for moving an IP flow between a non-3GPP wireless communications network and a 3GPP wireless communications network. As shown in FIG. 3, the UE 202 can have both non-3GPP and 3GPP wireless network access over the same existing PDN-GW 206 connection (e.g., over a multi-access PDN connection), as represented by step 302. At step 302, one or more IP existing flows can be routed over the non-3GPP wireless network access and one or more existing IP flows can be simultaneously routed over the 3GPP wireless network access. The UE initiated message flow 304 can be a UE initiated IP flow mobility process for moving one or more IP flows from the non-3GPP wireless network to the 3GPP wireless network or for moving one or more IP flows from the 3GPP wireless network to the non-3GPP wireless network.

At step 306, the UE 202 can generate a WLCP flow mobility request message. The WLCP flow mobility request message can include an indication of an IP flow to be moved. For example, the WLCP flow mobility request message can include an identification of one or more IP flows and can correspondingly indicate where each of the one or more IP flows is to be moved. The WLCP flow mobility request message can include an updated routing rule relating to one or more IP flows. The updated routing rule can be included in the PCO field of the WLCP flow mobility request message. As an alternative, an existing WLCP message can be used to request an IP flow mobility with a routing rule included in the PCO field of the existing WLCP message.

The UE 202 can transmit the WLCP flow mobility request message to the TWAG 204. In response, the TWAG 204 can generate a bearer resource command or a modify bearer request message at step 308. The bearer resource command or modify bearer request message can include the updated routing rule in the PCO field of the message. Alternatively, the bearer resource command or modify bearer request message can include the updated routing rule directly in the message. The bearer resource command or modify bearer request message can also identify an IP flow associated with the updated routing rule. As an example, the bearer resource command or modify bearer request message can include an FID. The TWAG can transmit the bearer resource command or modify bearer request message to the PDN-GW 206.

At step 310, the PDN-GW 206 and the hPCRF 208 can interact. The PDN-GW 206 and the hPCRF 208 can begin an IP-CAN session establishment procedure or an IP-CAN session modification procedure. As part of this interaction, the hPCRF 208 can store the updated routing rule. The hPCRF 208 can also update policy and charging control (PCC) rules based on the updated routing rule. The hPCRF 208 can then provide an acknowledgement to the PDN-GW 206 and can also include any updated PCC rules if applicable.

At step 312, the PDN-GW 206 can generate a bearer resource command or modify bearer response message. The generated bearer resource command or modify bearer response message can be transmitted to the TWAG 204. At part of step 312, the PDN-GW 206 can implement a dedicated bearer activation procedure, a bearer modification procedure, or a bearer deactivation procedure as described in 3GPP Technical Specification (TS) 23.401. As part of this step 312, the PDN-GW 206 can indicate to the hPCRF whether the provided PCC rules or decision could be enforced. The bearer resource command or modify bearer response message sent to the TWAG 204 can indicate whether the requested change in IP flow can be implemented. The bearer resource command or modify bearer response message can also include the updated routing rule in the PCO field of the message (e.g., as an indication of acceptance of the updated routing rule). Alternatively, the bearer resource command or modify bearer request message can include the updated routing rule directly in the message.

At step 314, the TWAG can generate a WLCP flow mobility response message. The WLCP flow mobility response message can indicate whether the IP flow change requested and initiated by the UE 202 in step 306 can or will be implemented. The TWAG can transmit the WLCP flow mobility response message to the UE 202. The WLCP flow mobility response message can include the requested updated routing rule in the PCO field of the WLCP flow mobility response message as an indication that the updated rule is accepted and can or will be implemented.

Figure 4:
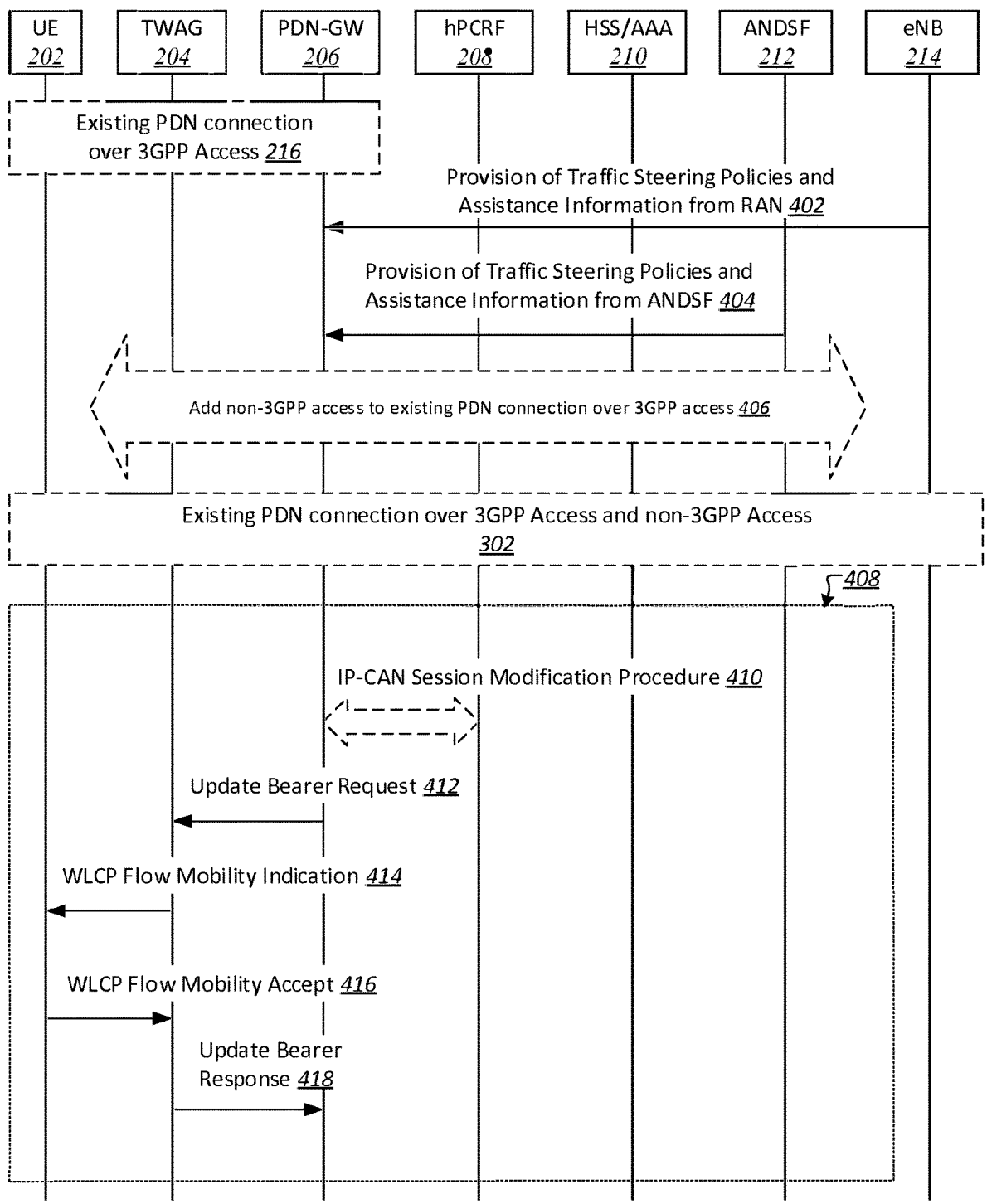
FIG. 4 illustrates an embodiment of a third message flow.

FIG. 4 illustrates one embodiment of a message flow 400, which may be representative of the operations executed by one or more embodiments described herein. The message flow 400 illustrates exemplary messages exchanged between multiple network elements. As shown in FIG. 4, the message flow 400 illustrates communications between the UE 202, the TWAG 204, the PDN-GW 204, the hPCRF 208, the HSS/AAA, the ANDSF 212, and the eNB 214.

The message flow 400 can include a network initiated message flow 408 for moving an IP flow between a non-3GPP wireless communications network and a 3GPP wireless communications network. Network initiated refers to a component of the 3GPP wireless communication network (e.g., initiated by the PDN-GW 206), other than the UE 202, determining that one or more IP flows provided to the UE 202 are to be moved or adjusted.

Operational steps 216, 402, 404, 406, and 302 can proceed the message flow 408. At step 216, the UE 202 is connected to a 3GPP wireless network access system. As such, the UE 202 can be provided with an internet connection through the PDN-GW 206 by way of the 3GPP wireless network. At step 402, the PDN-GW 206 can retrieve rules and/or policies for steering data traffic from the RAN by communicating with the eNB 214. Alternatively or in addition thereto, at step 404, the PGN-GW 206 can retrieve rules and/or policies for steering data traffic from the ANDSF 212. The PDN-206 and the ANDSF 212 can communicate over an s15 interface. The PDN-GW 206 can also be locally provisioned with routing rules by an operator with access to the PDN-GW 206. The rules and/or policies for steering data traffic can provide the PDN-GW 206 with rules for managing IP flows including for example, determining how different IP flows associated with the UE 202 are to be managed. Such rules and/or policies can specify the type of wireless access to be used for particular types of IP flows (e.g., all video IP flows are to be routed through non-3GPP wireless access when such access is available). The rules and/or policies can be based on user preferences, user subscription profiles, network configurations, data traffic conditions, QoS requirements, signal strength, and bandwidth availability.

At step 406, non-3GPP wireless network access is provided to the UE 202 over the existing PDN-GW 206 connection initially available at step 216 (e.g., thereby opening a multi-access PDN connection). Step 406 can be implemented according to message flow 222 described in relation to FIG. 2. Accordingly, step 406 can be implemented through a series of substeps that provide the UE 202 with non-3GPP wireless network access through a previously existing PDN-GW 206 connection. Subsequent to step 406, and prior to initiation of message flow 408, the UE 202 can be provided with access to both non-3GPP and 3GPP wireless networks through an existing PDN-GW 206 connection as shown in step 302 (e.g., a multi-access PDN connection). Subsequent to being placed in this operational state, a network initiated IP flow mobility sequence 408 can be implemented.

As part of message flow 408, at step 410 the PGN-GW 206 initiates an IP-CAN session modification procedure 410 with the hPCRF 208. As part of the IP-CAN session modification procedure, the PGN-GW 206 can provide information about the non-3GPP wireless network to the hPCRF 208. The hPCRF 208 can ensure that the Bearer Binding and Event Reporting Function (BBERF), which can be located with or be a function part of the PDN-GW 206, is notified of QoS requirements. This can be completed by a gateway control session and QoS rules provision procedure as specified in 3GPP TS 23.203.

At step 412, the PDN-GW 206 can generate an update bearer request message. The update bearer request message can identify an IP flow associated with the UE 202 that is to be moved from a first wireless network access to a second wireless network access. The update bearer request message can further provide additional IP flow information including an updated routing rule. The updated routing rule can be included directly in the message or can be included in a PCO field of the message. The updated routing rule can be placed in a PCO field of the update bearer request message. The PDN-GW 206 can transmit the update bearer request message to the TWAG 204.

At step 414, the TWAG 204 can generate a WLCP flow mobility indication message. The WLCP flow mobility indication message can be transmitted to the UE 202. The WLCP flow mobility indication message can notify the UE 202 of changes that can or will be made to one or more of its IP flows. The WLCP flow mobility indication message can also provide an indication of an updated routing rule. The updated routing rule can be carried directly in the WLCP flow mobility indication message or can be placed in the PCO field of the WLCP flow mobility indication message.

At step 416, the UE 202 can generate a WLCP flow mobility accept message. The WLCP flow mobility accept message can include an indication of acknowledgement about the IP flow to be moved and/or adjusted based on one or more updated routing rules as directed and initiated by the 3GPP wireless access network. The updated routing rule accepted or acknowledged by the UE 202 can be placed in the PCO field of the WLCP flow mobility accept message. The WLCP flow mobility accept message can be transmitted to the TWAG 204

At step 418, the TWAG 204 can generate an update bearer response message. The update bearer response message can indicate that the UE 202 acknowledges and/or accepts the network initiated IP flow management. The TWAG 204 can transmit the update bearer response message to the PDN-GW 206. The update bearer response message can included the updated routing rule directly in the message or in a PCO field of the message (e.g., as an indication that the routing rule is acknowledged).

The UE 202 can have all of the IP flows associated with the UE 202 moved to a non-3GPP wireless network access system. In doing so, no IP flows may be associated with the UE 202 through a 3GPP wireless network access system (e.g., an LTE wireless network system). Detaching the UE 202 from access to the 3GPP network and then re-attaching at a later can be a cumbersome process and can require bandwidth intensive signaling. Accordingly, in some embodiments, when the UE 202 no longer has any IP flows through the 3GPP network, the UE 202 can operate to occasionally or periodically perform a routing area update (RAU) or a tracking area update (TAU) over the 3GPP network to maintain the 3GPP network connection to the UE 202.

Additionally, in some embodiments, it is desirable for the 3GPP network to not detach the UE 202 when the UE 202 no longer has any IP flows through the 3GPP network. To maintain a 3GPP connection to the UE 202 under these circumstances, the PDN-GW 206 can receive and process and indication that the 3GPP network connection (e.g., an LTE network connection) is to be maintained and not terminated or detached. The indication can be an indication that the 3GPP network connection available to the UE 202 is configured for network based IP flow mobility. As an example, the indication can be the setting of the request type field in a WLCP PDN connection request message (e.g., as generated at step 224 in message flow 222). Based on this indication, the PDN-GW 206 can maintain the 3GPP network connection with the UE 202 (e.g., through PDN-GW 206 and a corresponding eNB servicing the UE 202).

The PDN-GW 206 can imitate a detach procedure if the UE 202 is switched off or if all PDN-GW 206 connections with the UE 202 are terminated. In some embodiments, the PDN-GW 206 can maintain the 3GPP network connection (devoid of any IP flows) to the UE 202 for a specified period of time. As an example, the PDN-GW 206 can start a timer at substantially the time the PDN-GW 206 determines that all IP flows are moved to the non-3GPP network from the 3GPP network. At the expiration of the timer, the PDN-GW 206 can terminate the 3GPP network connection with the UE 202 unless an IP flow is carried on the 3GPP network connection prior to the expiration of the timer. The PDN-GW 206 can also determine whether the UE 202 should be detached from the 3GPP network access based on an operator's configuration of the network (e.g., based on an operator's configuration of the PDN-GW 206), network load, the type of IP flows provided to the UE 202 or to other UEs associated with the PDN-GW 206.

Figure 5:
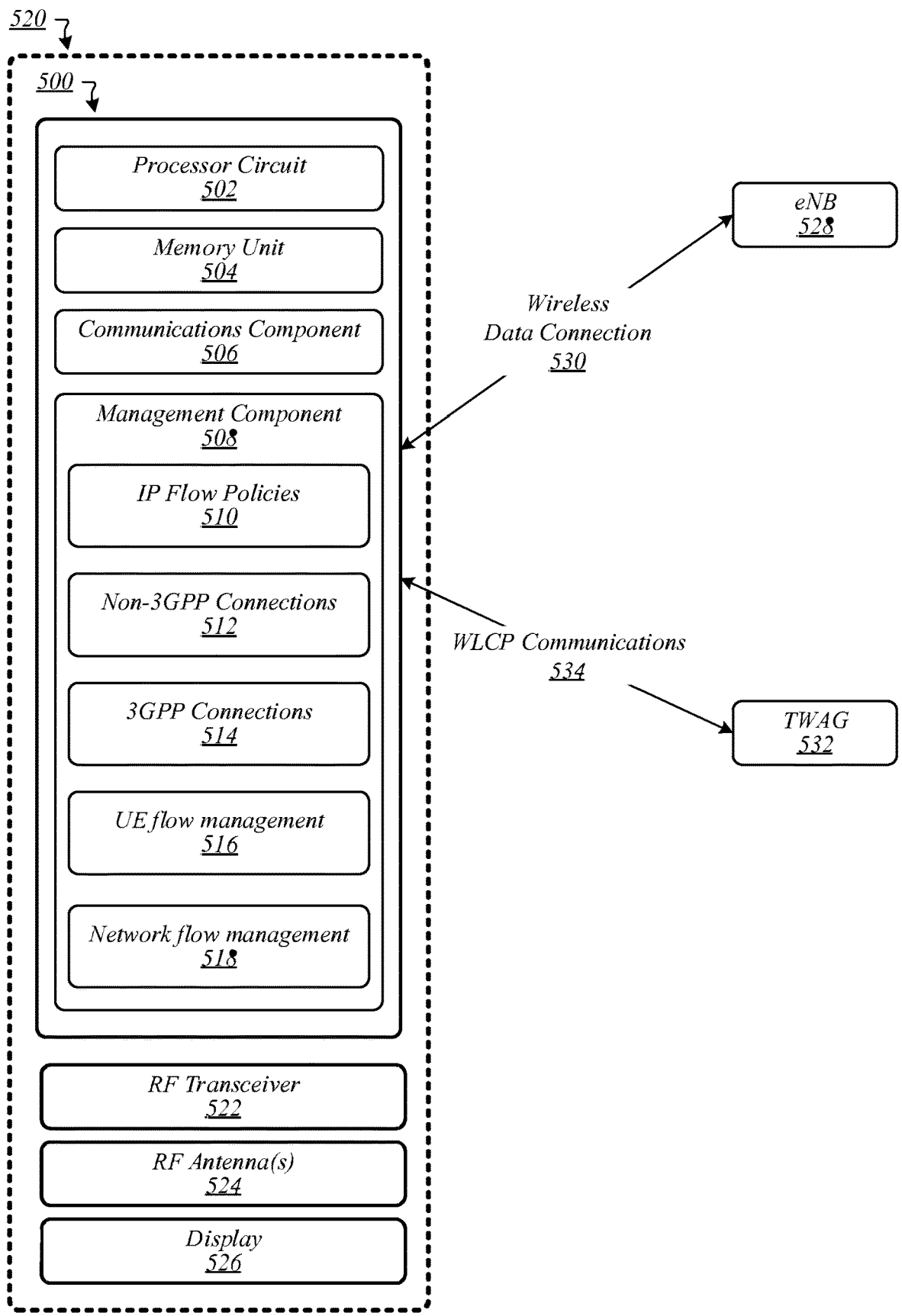
FIG. 5 illustrates an embodiment of a first apparatus and an embodiment of a first system.

FIG. 5 illustrates a block diagram of an apparatus 500. Apparatus 500 may be representative of a UE that implements techniques for UE initiated IP flow mobility and/or responding to network initiated IP flow mobility. As such, apparatus 500 may implement portions of the message flows described in relation to FIGS. 2-4 that involve the UE 202 as described therein, including the generation, transmission, reception, and processing of messages involving the UE 202. As shown in FIG. 5, apparatus 500 can comprise multiple elements including a processor circuit 502, a memory unit 504, a communications component 506, and a discovery management component 508. The embodiments, however, are not limited to the type, number, or arrangement of elements shown in this figure.

In some embodiments, apparatus 500 may comprise processor circuit 302. Processor circuit 502 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 502 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 502 may be implemented as a general purpose processor, such as a processor made by Intel® Corporation, Santa Clara, Calif. The embodiments are not limited in this context.

In various embodiments, apparatus 500 may comprise or be arranged to communicatively couple with a memory unit 504. Memory unit 504 may be implemented using any machine-readable or computer-readable media capable of storing data, including both volatile and non-volatile memory. For example, memory unit 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in some embodiments. The embodiments are not limited in this context.

In various embodiments, apparatus 500 may comprise a communications component 506. Communications component 506 may comprise logic, circuitry, and/or instructions operative to send messages to one or more remote devices and/or to receive messages from one or more remote devices. In some embodiments, communications component 506 may be operative to send and/or receive messages over one or more wired connections, one or more wireless connections, or a combination of both. In various embodiments, communications component 506 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 500 may comprise a management component 508. Management component 508 may comprise logic, circuitry, and/or instructions operative to manage functional operations of the apparatus 500 including directing the communications component 506 to generate and transmit messages and/or to receive and process messages. The embodiments are not limited in this context.

FIG. 5 also illustrates a block diagram of a system 520. System 520 may comprise any of the aforementioned elements of apparatus 500. System 520 may further comprise a radio frequency (RF) transceiver 522. RF transceiver 522 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 522 may operate in accordance with one or more applicable standards in any version. The embodiments are not limited in this context.

In various embodiments, system 520 may comprise one or more RF antennas 524. Examples of any particular RF antenna 524 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 522 may be operative to send and/or receive messages and/or data using one or more RF antennas 524. The embodiments are not limited in this context.

In various embodiments, system 520 may comprise a display 526. Display 526 may comprise any display device capable of displaying information received from processor circuit 502. Examples for display 526 may include a television, a monitor, a projector, and a computer screen. In one embodiment, for example, display 526 may be implemented by a liquid crystal display (LCD), light emitting diode (LED) or other type of suitable visual interface. Display 526 may comprise, for example, a touch-sensitive display screen ("touchscreen"). In some implementations, display 526 may comprise one or more thin-film transistors (TFT) LCD including embedded transistors. The embodiments, however, are not limited to these examples.

In various embodiments, communications component 506 may be operative to transmit and receive messages with an eNB 528. The eNB 528 can be representative of the eNB 214 depicted and described in relation to FIGS. 2-4. Communication with the eNB 528 can be implemented over a wireless data connection 530 in accordance with one or more cellular communication protocols. Further, the communications component 506 may be operative to transmit and receive messages with a TWAG 532. The TWAG 532 can be representative of the TWAG 204 depicted and described in relation to FIGS. 2-4. Communication with TWAG 532 can be implemented using a WLCP communications link 534 as referenced in relation to the operating environments 200, 300 and 400 depicted and described in relation to FIGS. 2-4.

In various embodiments, the management component 508 can include an IP flow policies module 510, a non-3GPP connections module 512, a 3GPP connections module 514, a UE flow management module 516, and a network flow management 518. The IP flow policies module 510 can direct the provisioning of any rules governing IP flows associated with the apparatus 500. The IP flow policies module 510 can direct the communications component 506 to receive data traffic steering policies and/or assistance information from the eNB 528 or from an ANDSF (e.g., the ANDSF 212). The IP flow policies module 510 can ensure the apparatus 500 operates in accordance with routing rules provided to the apparatus 500, for example, by any network element depicted and described in relation to the operating environments 200, 300 and 400 of FIGS. 2-4.

In various embodiments, the non-3GPP connections module 512 can direct the provisioning of any non-3GPP wireless network connections associated with the apparatus 500. For example, the non-3GPP connections module 512 can manage connections with one or more Wi-Fi wireless networks, including a TWAN. The non-3GPP connections module 512 can direct the apparatus 500 to implement portions of the message flow 222 for adding non-3GPP wireless network access for the apparatus 500 through an existing PDN connection to form a multi-access PDN connection. As such, the non-3GPP connections module 512 can direct the communications component 506 to generate and transmit a WLCP PDN connection request message and to receive and process a WLCP PDN connection response message. The non-3GPP connections module 512 can direct the apparatus 500 to maintain any IP flow provided over any non-3GPP wireless connection in accordance with any IP flow routing rule provided by the IP flow policies component 510.

In various embodiments, the 3GPP connections module 514 can direct the provisioning of any 3GPP connections associated with the apparatus 500. The 3GPP connections module 514 can direct the communications component 506 to generate and transmit and/or receive and process any communication message with the eNB 528. The 3GPP connections module 514 can direct the apparatus 500 to maintain any IP flow provided over any 3GPP wireless connection in accordance with any IP flow routing rule provided by the IP flow policies component 510. The 3GPP connections module 514 can also maintain 3GPP network access when all IP flows associated with the apparatus 500 have been moved to non-3GPP network access such that no IP flows exist on the 3GPP network connection. As an example, the 3GPP connections module 514 can maintain the 3GPP network connection by directed the apparatus to perform RAU and/or TAU operations, for example, periodically or occasionally.

In various embodiments, the UE flow management module 516 can implement any UE initiated IP flow mobility procedures. The UE flow management module 516 can direct the apparatus 500 to initiate a flow mobility procedure. The UE initiated flow mobility procedure can involving moving one or more flows from a first wireless network access to a second wireless network access. The initiated flow mobility procedure can also involve updating a routing rule for one or more IP flows. The UE flow management module 516 can direct the apparatus 500 to implement portions of the UE initiated message flow 304 for moving an IP flow between a non-3GPP wireless communications network and a 3GPP wireless communications network as depicted and described in relation to FIG. 3. As such, the UE flow management module 516 can direct the communications component 506 to generate and transmit a WLCP flow mobility request message or to receive and process a WLCP PDN flow mobility response message. The UE flow management module 516 can direct the apparatus 500 to manage UE initiated mobility procedures in accordance with any IP flow policies managed by the IP flow policies module 510.

In various embodiments, the network flow management module 518 can operate responsive to any network initiated IP flow mobility procedures. The network flow management module 518 can direct the apparatus 500 to implement procedures expected in response to a network initiated flow mobility procedure. The network initiated flow mobility procedure can involve moving one or more flows from a first wireless network access to a second wireless network access. The network initiated flow mobility procedure can also involve updating a routing rule for one or more IP flows. The network flow management module 518 can direct the apparatus 500 to implement portions of the network initiated message flow 408 for moving an IP flow between a non-3GPP wireless communications network and a 3GPP wireless communications network as depicted and described in relation to FIG. 4. As such, the network flow management module 518 can direct the communications component 506 to receive and process a WLCP flow mobility indication message and to generate and transmit a WLCP flow mobility accept message. The network flow management module 518 can direct the apparatus 500 to operate in response to any network initiated mobility procedures in accordance with any IP flow policies managed by the IP flow policies module 510.

Figure 6:
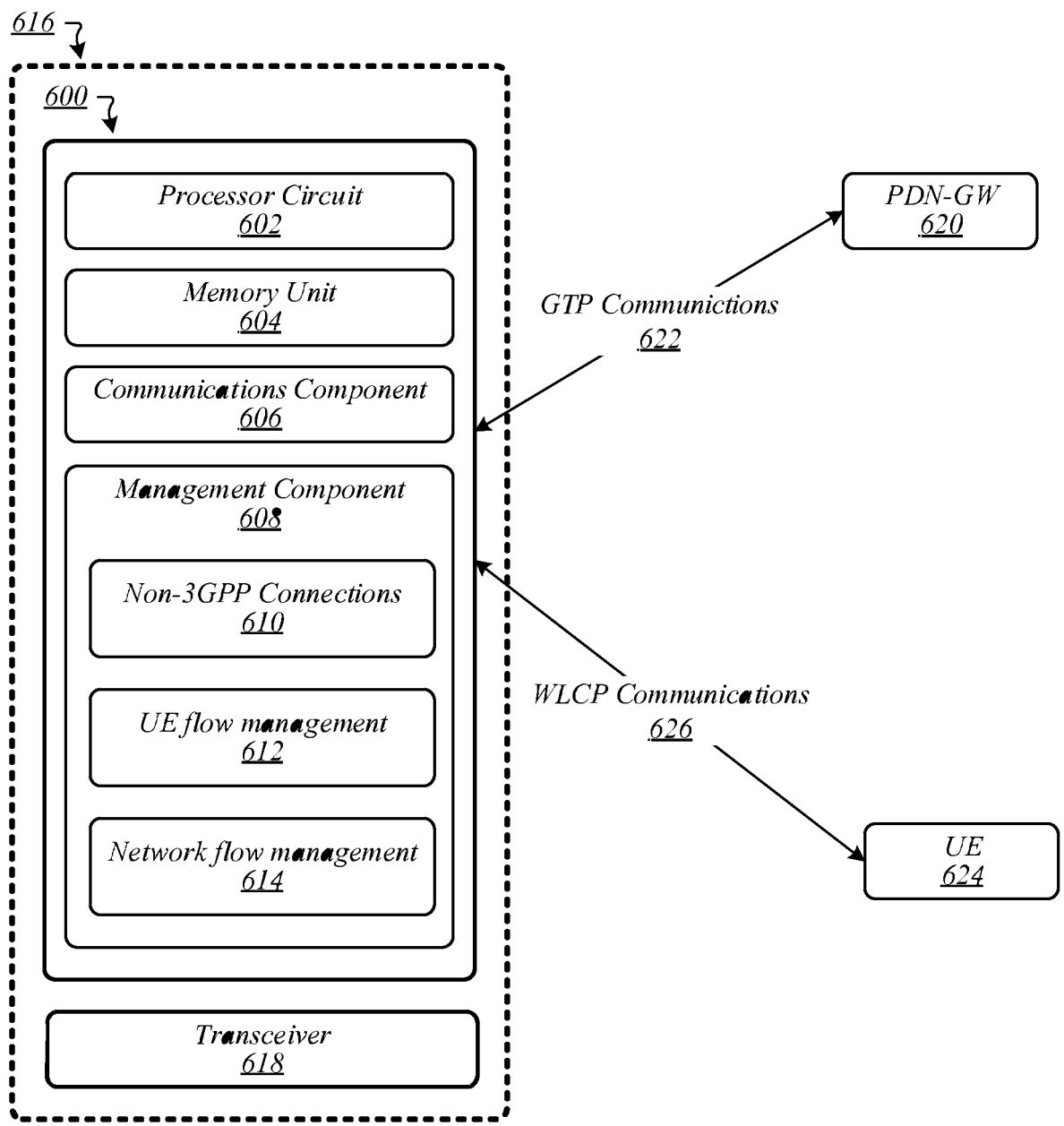
FIG. 6 illustrates an embodiment of a second apparatus and an embodiment of a second system.

FIG. 6 illustrates a block diagram of an apparatus 600. Apparatus 600 may be representative of a TWAG that implements techniques for responding to UE initiated IP flow mobility procedures and responding to network based IP flow mobility procedures. As such, apparatus 600 may implement portions of the message flows described in relation to FIGS. 2-4 that involve the TWAG 204 as described therein, including the generation, transmission, reception and processing of messages involving the TWAG 202. As shown in FIG. 6, apparatus 600 can comprise multiple elements including a processor circuit 602, a memory unit 604, a communications component 606, and a discovery management component 608. The embodiments, however, are not limited to the type, number, or arrangement of elements shown in this figure.

In some embodiments, the apparatus 600 may comprise processor circuit 602. Processor circuit 602 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 602 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 602 may be implemented as a general purpose processor, such as a processor made by Intel® Corporation, Santa Clara, Calif. The embodiments are not limited in this context.

In various embodiments, apparatus 600 may comprise or be arranged to communicatively couple with a memory unit 604. Memory unit 604 may be implemented using any machine-readable or computer-readable media capable of storing data, including both volatile and non-volatile memory. For example, memory unit 604 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in some embodiments. The embodiments are not limited in this context.

In various embodiments, apparatus 600 may comprise a communications component 606. Communications component 606 may comprise logic, circuitry, and/or instructions operative to send messages to one or more remote devices and/or to receive messages from one or more remote devices. In some embodiments, communications component 606 may be operative to send and/or receive messages over one or more wired connections, one or more wireless connections, or a combination of both. In various embodiments, communications component 606 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 600 may comprise a management component 608. Management component 608 may comprise logic, circuitry, and/or instructions operative to manage functional operations of the apparatus 600 including directing the communications component 606 to generate and transmit messages and/or to receive and process messages. The embodiments are not limited in this context.

FIG. 6 also illustrates a block diagram of a system 616. System 616 may comprise any of the aforementioned elements of apparatus 600. System 616 may further comprise a transceiver 618. Transceiver may be capable of transmitting and receiving signals using various suitable communications techniques. Such techniques may involve communications across one or more wired networks. In communicating across such networks, the transceiver 618 may operate in accordance with one or more applicable standards in any version. The embodiments are not limited in this context.

In various embodiments, communications component 606 may be operative to transmit and receive messages with PDN-GW 620. The PDN-GW 620 can be representative of the PDN-GW 206 depicted and described in relation to FIGS. 2-4. Communication with the PDN-GW 620 can be implemented over a GTP communications link 622 as referenced in relation to the operating environments 200, 300 and 400 depicted and described in relation to FIGS. 2-4. Further, the communications component 506 may be operative to transmit and receive messages with a UE 624. The UE 624 can be representative of the UE 202 depicted and described in relation to FIGS. 2-4, as well as the UE 500 depicted and described in relation to FIG. 5. Communication with the UE 624 can be implemented using a WLCP communications link 626 as referenced in relation to the operating environments 200, 300 and 400 depicted and described in relation to FIGS. 2-4.

In various embodiments, the management component 608 can include a non-3GPP connections module 610, a UE flow management module 612, and a network flow management module 614.

In various embodiments, the non-3GPP connections module 610 can support the provisioning of any non-3GPP connections associated with the UE 624. The non-3GPP connections module 610 can direct the apparatus 600 to implement portions of the message flow 222 for adding non-3GPP wireless network access for the UE 624 through an existing PDN connection. As such, the non-3GPP connections module 610 can direct the communications component 606 to generate and transmit a create session request message, a PDN connectivity accept message, or a WLCP PDN connection response message. The non-3GPP connections module 610 can also direct the communications component 606 to receive and process a WLCP PDN connection request message, a create session response message, and a PDN connectivity complete message.

In various embodiments, the UE flow management module 612 can support the implementation of any UE initiated IP flow mobility procedures. The UE flow management module 612 can direct the apparatus 600 to respond to a flow mobility procedure initiated by the UE 624. The UE flow management module 612 can direct the apparatus 600 to implement portions of the UE initiated message flow 304 for moving an IP flow between a non-3GPP wireless communications network and a 3GPP wireless communications network as depicted and described in relation to FIG. 3. As such, the UE flow management module 612 can direct the communications component 606 to generate and transmit a bearer resource command or modify bearer request message or a WLCP flow mobility response message. The UE flow management module 612 can also direct the communications component 606 to receive and process a bearer resource command or modify bearer response message or a WLCP flow mobility request message.

In various embodiments, the network flow management module 614 can support the implementation of any network initiated IP flow mobility procedures. The network flow management module 642 can direct the apparatus 600 to respond to a flow mobility procedure as directed by the PDN-GW 620. The network flow management module 614 can direct the apparatus 600 to implement portions of the network initiated message flow 408 for moving an IP flow between a non-3GPP wireless communications network and a 3GPP wireless communications network as depicted and described in relation to FIG. 4. As such, the network flow management module 614 can direct the communications component 606 to generate and transmit a WLCP flow mobility indication message and an update bearer response message. The network flow management module 614 can also direct the communications component 606 to receive and process an update bearer request message or a WLCP flow mobility accept message.

Figure 7:
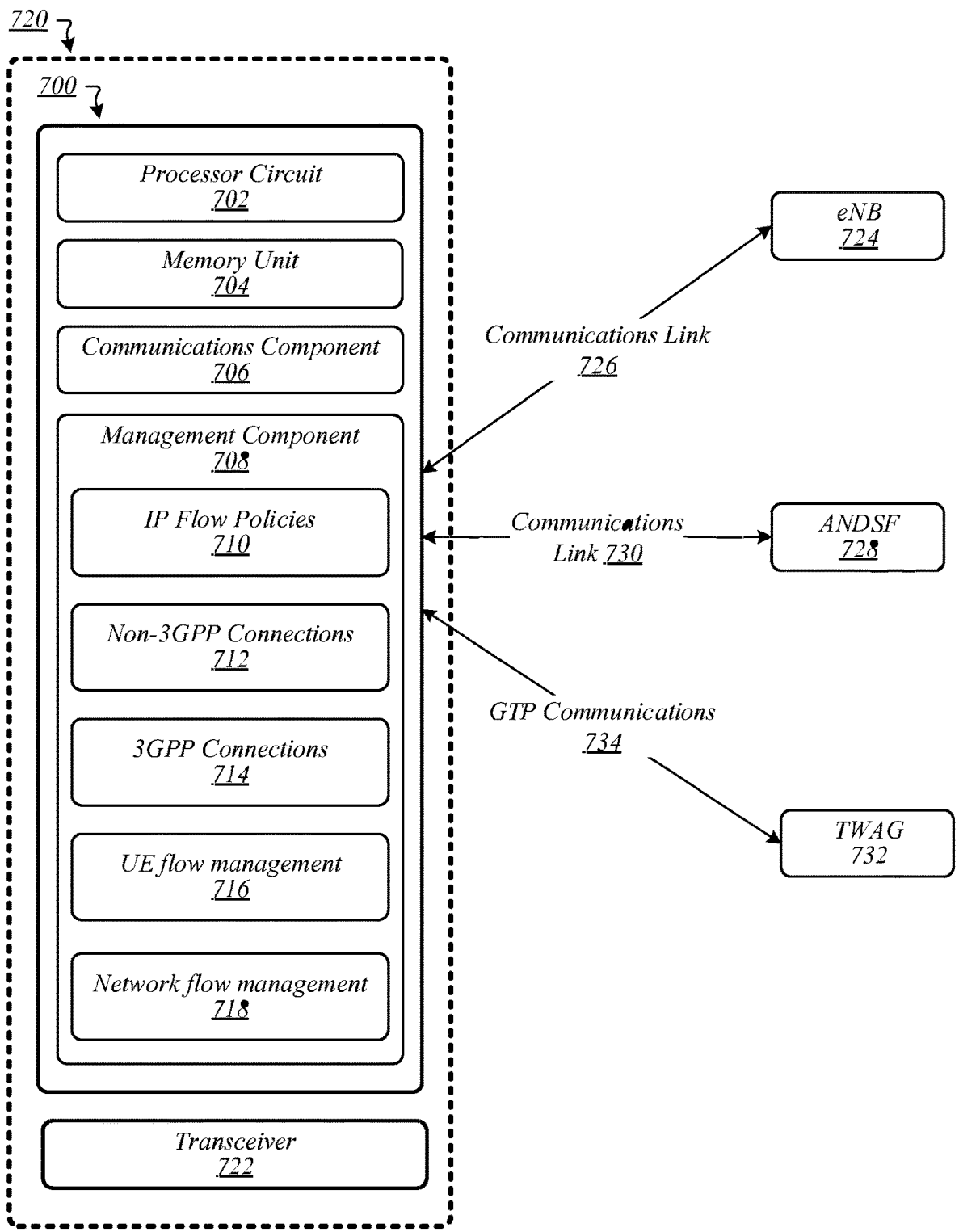
FIG. 7 illustrates an embodiment of a third apparatus and an embodiment of a third system.

FIG. 7 illustrates a block diagram of an apparatus 700. Apparatus 700 may be representative of a PDN-GW that implements techniques for providing IP flow mobility including responding to UE initiated IP flow mobility and responding to network initiated IP flow mobility. As such, apparatus 700 may implement portions of the message flows described in relation to FIGS. 2-4 that involve the PDN-GW 206 as described therein, including the generation, transmission, reception, and processing of messages involving the PDN-GW 206. As shown in FIG. 7, apparatus 700 can comprise multiple elements including a processor circuit 702, a memory unit 704, a communications component 706, and a discovery management component 708. The embodiments, however, are not limited to the type, number, or arrangement of elements shown in this figure.

In some embodiments, apparatus 700 may comprise processor circuit 702. Processor circuit 702 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 702 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 702 may be implemented as a general purpose processor, such as a processor made by Intel® Corporation, Santa Clara, Calif. The embodiments are not limited in this context.

In various embodiments, apparatus 700 may comprise or be arranged to communicatively couple with a memory unit 704. Memory unit 704 may be implemented using any machine-readable or computer-readable media capable of storing data, including both volatile and non-volatile memory. For example, memory unit 704 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 704 may be included on the same integrated circuit as processor circuit 702, or alternatively some portion or all of memory unit 704 may be disposed on an integrated circuit or other medium, for example a hard disk drive, that is external to the integrated circuit of processor circuit 702. Although memory unit 704 is comprised within apparatus 700 in FIG. 5, memory unit 704 may be external to apparatus 700 in some embodiments. The embodiments are not limited in this context.

In various embodiments, apparatus 700 may comprise a communications component 706. Communications component 706 may comprise logic, circuitry, and/or instructions operative to send messages to one or more remote devices and/or to receive messages from one or more remote devices. In some embodiments, communications component 706 may be operative to send and/or receive messages over one or more wired connections, one or more wireless connections, or a combination of both. In various embodiments, communications component 706 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 700 may comprise a management component 708. Management component 708 may comprise logic, circuitry, and/or instructions operative to manage functional operations of the apparatus 700 including directing the communications component 706 to generate and transmit messages and/or to receive and process messages. The embodiments are not limited in this context.

FIG. 7 also illustrates a block diagram of a system 720. System 720 may comprise any of the aforementioned elements of apparatus 700. System 720 may further comprise a transceiver 722. Transceiver may be capable of transmitting and receiving signals using various suitable communications techniques. Such techniques may involve communications across one or more wired networks. In communicating across such networks, the transceiver 722 may operate in accordance with one or more applicable standards in any version. The embodiments are not limited in this context.

In various embodiments, communications component 706 may be operative to transmit and receive messages with an eNB 724. The eNB 724 can be representative of the eNB 214 depicted and described in relation to FIGS. 2-4. Communication with the eNB 724 can be implemented over a wireless data connection 726 in accordance with one or more cellular communication protocols. Further, the communications component 706 may be operative to transmit and receive messages with a TWAG 732. The TWAG 732 can be representative of the TWAG 204 depicted and described in relation to FIGS. 2-4. Communication with TWAG 532 can be implemented using a WLCP communications link 734 as referenced in relation to the operating environments 200, 300 and 400 depicted and described in relation to FIGS. 2-4. The communications component 706 may be operative to transmit and receive messages with an ANDSF 728. The ANDSF 728 can be representative of the ANDSF 212 depicted and described in relation to FIGS. 2-4. Communication with the ANDSF 212 can be implemented over a communications link 730 in accordance with one or more communication protocols.

In various embodiments, the management component 708 can include an IP flow policies module 710, a non-3GPP connections module 712, a 3GPP connections module 714, a UE flow management module 716, and a network flow management module 718. The IP flow policies module 710 can direct the provisioning of any rules governing IP flows associated with the apparatus 700. The IP flow policies module 710 can direct the communications component 706 to receive data traffic steering policies and/or assistance information from the eNB 724 or from the ANDSF 728. The IP flow policies module 710 can ensure the apparatus 700 operates in accordance with routing rules provided to the apparatus 700, for example, by any network element depicted and described in relation to the operating environments 200, 300 and 400 of FIGS. 2-4.

In various embodiments, the non-3GPP connections module 712 can direct the provisioning of any non-3GPP wireless network connections associated with the apparatus 700. For example, the non-3GPP connections module 712 can manage any non-3GPP wireless connections routed through the apparatus 700. The non-3GPP connections module 712 can direct the apparatus 700 to implement portions of the message flow 222 for adding non-3GPP wireless network access for a remote UE through an existing PDN connection (e.g., thereby creating a multi-access PDN connection). The non-3GPP connections module 712 can direct the apparatus 700 to maintain any IP flow routed through the apparatus 700 and provided over any non-3GPP wireless connection in accordance with any IP flow routing rule provided by the IP flow policies component 710.

In various embodiments, the 3GPP connections module 714 can direct the provisioning of any 3GPP connections associated with the apparatus 700. For example, the 3GPP connections module 714 can manage any 3GPP wireless connections routed through the apparatus 700. The 3GPP connections module 714 can direct the apparatus 700 to maintain any IP flow routed through the apparatus 700 and provided over any 3GPP wireless connection in accordance with any IP flow routing rule provided by the IP flow policies component 710. The 3GPP connections module 714 can also maintain 3GPP network access to a remote UE when all IP flows associated with the remote UE have been moved to non-3GPP network access such that no IP flows exist on the 3GPP network connection, as descripted herein. In some embodiments, the 3GPP connections module 714 can maintain the 3GPP connection with the remote UE until the UE is turned off or until all PDN connections associated with the remote are terminated. In some embodiments, the 3GPP connections module 714 can terminate the 3GPP connection with the remote UE base on an operator's configuration of the network, local configuration of the apparatus 700 (e.g., by an operator), network load, and/or the type of IP flows still associated with the remote UE over the non-3GPP network connection. In some embodiments, the 3GPP connections module 714 can initiate a timer that starts substantially at the time it is determined that all IP flows are on a non-3GPP network connection. After the expiration of the timer, the 3GPP connections module 714 can initiate detachment of the remote UE and/or termination of the maintained 3GPP network access.

As an example, the 3GPP connections module 514 can maintain the 3GPP network connection by directed the apparatus to perform RAU and/or TAU operations, for example, periodically or occasionally.

In various embodiments, the UE flow management module 716 can support any UE initiated IP flow mobility procedures. The UE flow management module 716 can direct the apparatus 700 to respond to a flow mobility procedure initiated by a remote UE. The UE initiated flow mobility procedure can involving moving one or more flows from a first wireless network access to a second wireless network access. The initiated flow mobility procedure can also involve updating a routing rule for one or more IP flows. The UE flow management module 716 can direct the apparatus 700 to implement portions of the UE initiated message flow 304 for moving an IP flow between a non-3GPP wireless communications network and a 3GPP wireless communications network as depicted and described in relation to FIG. 3. As such, the UE flow management module 716 can direct the communications component 706 to generate and transmit a bearer resource command or modify bearer request message. The UE flow management module 716 can also direct the communications component 706 to receive and process a bearer resource command or modify bearer request message. The UE flow management module 716 can direct the apparatus 700 to manage UE initiated mobility procedures in accordance with any IP flow policies managed by the IP flow policies module 710.

In various embodiments, the network flow management module 718 can operate responsive to any network initiated IP flow mobility procedures. The network flow management module 718 can direct the apparatus 700 to implement procedures expected in response to a network initiated flow mobility procedure. The network initiated flow mobility procedure can involve moving one or more flows from a first wireless network access to a second wireless network access. The network initiated flow mobility procedure can also involve updating a routing rule for one or more IP flows. The network flow management module 718 can direct the apparatus 700 to implement portions of the network initiated message flow 408 for moving an IP flow between a non-3GPP wireless communications network and a 3GPP wireless communications network as depicted and described in relation to FIG. 4. As such, the network flow management module 718 can direct the communications component 706 to receive and process an update bearer response message message and to generate and transmit an update bearer response message. The network flow management module 718 can direct the apparatus 700 to operate in response to any network initiated mobility procedures in accordance with any IP flow policies managed by the IP flow policies module 710.

FIG. 8 illustrates a format of a WLCP flow mobility request message 800 such as may be representative of various embodiments. The WLCP flow mobility request message 800 may be representative of the format of a message transmitted by a UE to a TWAG as part of a UE initiated flow mobility procedure, such as depicted and described in relation to message flow 304 in FIG. 3 (e.g., at step 306).

As shown in FIG. 8, the format of the WLCP flow mobility request message 800 can be described by an information element identifier (IEI) field 802, an information element field 804, a type or reference field 806, a presence field 808, a format field 810, and a length field 812. The IE field 804 can list the individual information elements that form a generated or constructed message in the order of their appearance in the message. The IEI filed 802 can list any identifier that precedes a particular information element. As shown in FIG. 8, an IEI value can precede a PCO information element included in the message. The type or reference field 806 can provide a description for an information element listed in the information element field 804. The presence field 808 can specify if a particular information element is mandatory (e.g., indicated by an "M") or is optional "e.g., as indicated by an "O"). The format field 810 can specify the format of encoding a corresponding information element listed in the information element field 804. The length field 812 can specify a length (e.g., a number of bits or octets) of an information element listed in the information element field 804. The embodiments are not limited to these examples.

FIG. 9 illustrates a format of a WLCP flow mobility response message 900 such as may be representative of various embodiments. The WLCP flow mobility response message 900 may be representative of the format of a message transmitted by a TWAG to a UE as part of a UE initiated flow mobility procedure, such as depicted and described in relation to message flow 304 in FIG. 3 (e.g., at step 314).

As shown in FIG. 9, the format of the WLCP flow mobility response message 900 can be described by an IEI field 902, an information element field 904, a type or reference field 906, a presence field 908, a format field 910, and a length field 912. The IE field 904 can list the individual information elements that form a generated or constructed message in the order of their appearance in the message. The IEI filed 902 can list any identifier that precedes a particular information element. As shown in FIG. 9, an IEI value can precede a PCO information element included in the message. The type or reference field 906 can provide a description for an information element listed in the information element field 904. The presence field 908 can specify if a particular information element is mandatory (e.g., indicated by an "M") or is optional "e.g., as indicated by an "O"). The format field 910 can specify the format of encoding a corresponding information element listed in the information element field 904. The length field 912 can specify a length (e.g., a number of bits or octets) of an information element listed in the information element field 904. The embodiments are not limited to these examples.

FIG. 10 illustrates a format of a WLCP flow mobility indication message 1000 such as may be representative of various embodiments. The WLCP flow mobility indication message 1000 may be representative of the format of a message transmitted by a TWAG to a UE as part of a network initiated flow mobility procedure, such as depicted and described in relation to message flow 408 in FIG. 3 (e.g., at step 414).

As shown in FIG. 10, the format of the WLCP flow mobility indication message 1000 can be described by an IEI field 1002, an information element field 1004, a type or reference field 1006, a presence field 1008, a format field 1010, and a length field 1012. The IE field 1004 can list the individual information elements that form a generated or constructed message in the order of their appearance in the message. The IEI filed 1002 can list any identifier that precedes a particular information element. As shown in FIG. 10, an IEI value can precede a PCO information element included in the message. The type or reference field 1006 can provide a description for an information element listed in the information element field 1004. The presence field 1008 can specify if a particular information element is mandatory (e.g., indicated by an "M") or is optional "e.g., as indicated by an "O"). The format field 1010 can specify the format of encoding a corresponding information element listed in the information element field 1004. The length field 1012 can specify a length (e.g., a number of bits or octets) of an information element listed in the information element field 1004. The embodiments are not limited to these examples.

FIG. 11 illustrates a format of a WLCP flow mobility accept message 1100 such as may be representative of various embodiments. The WLCP flow mobility accept message 1100 may be representative of the format of a message transmitted by a TWAG to a UE as part of a network initiated flow mobility procedure, such as depicted and described in relation to message flow 408 in FIG. 3 (e.g., at step 416).

As shown in FIG. 11, the format of the WLCP flow mobility accept message 1100 can be described by an IEI field 1102, an information element field 1104, a type or reference field 1106, a presence field 1108, a format field 1110, and a length field 1112. The IE field 1104 can list the individual information elements that form a generated or constructed message in the order of their appearance in the message. The IEI filed 1102 can list any identifier that precedes a particular information element. As shown in FIG. 11, an IEI value can precede a PCO information element included in the message. The type or reference field 1106 can provide a description for an information element listed in the information element field 1104. The presence field 1108 can specify if a particular information element is mandatory (e.g., indicated by an "M") or is optional "e.g., as indicated by an "O"). The format field 1110 can specify the format of encoding a corresponding information element listed in the information element field 1104. The length field 1112 can specify a length (e.g., a number of bits or octets) of an information element listed in the information element field 1104. The embodiments are not limited to these examples.

Figure 12:
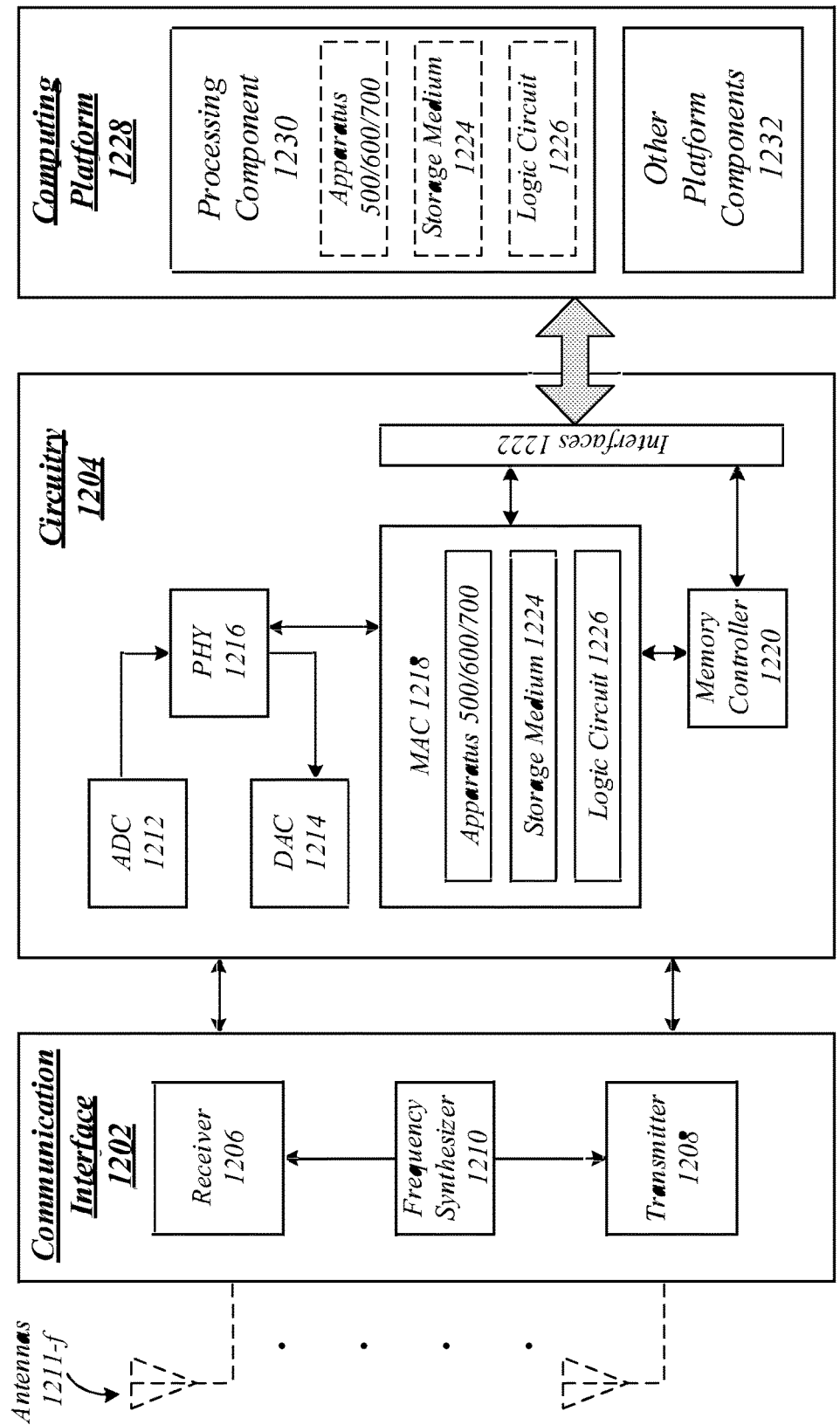
FIG. 12 illustrates an embodiment a device.

FIG. 12 illustrates an embodiment of a communications device 1200 that may implement one or more of apparatus 500 and/or system 520 of FIG. 5, apparatus 600 and/or system 616 of FIG. 6, and apparatus 700 and/or system 720 of FIG. 7 and/or may implement portions of the message flows depicted in the message flow operating environments 200, 300, and 400 as described in relation to FIGS. 2-4.

As shown in FIG. 12, the communications device 1200 can include a storage medium 1224. The storage medium 1224 may comprise any non-transitory computer-readable storage medium or machine-readable storage medium, such as an optical, magnetic or semiconductor storage medium. In various embodiments, the storage medium 1224 may comprise an article of manufacture. In some embodiments, the storage medium 1224 may store computer-executable instructions, such as computer-executable instructions to implement one or more of the operations described in relation to one or more of apparatus 500 and/or system 520 of FIG. 5, apparatus 600 and/or system 616 of FIG. 6, and apparatus 700 and/or system 720 of FIG. 7 and/or to implement one or more of operations described for one or more of the message flows depicted in the message flow operating environments 200, 300, and 400 as described in relation to FIGS. 2-4, for example. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

In various embodiments, device 1200 may comprise a logic circuit 1226. The logic circuit 1226 may include physical circuits to perform operations described for one or more of apparatus 500 and/or system 520 of FIG. 5, apparatus 600 and/or system 616 of FIG. 6, apparatus 700 and/or system 720 of FIG. 7, storage medium 1224 and/or to perform operations described for one or more of the message flows depicted in the message flow operating environments 200, 300, and 400 as described in relation to FIGS. 2-4, for example. As shown in FIG. 12, device 1200 may include a communication interface 1202, circuitry 1204, and computing platform 1228, although the embodiments are not limited to this configuration.

The device 1200 may implement some or all of the aforementioned structure and/or operations in a single computing entity, such as entirely within a single device. Alternatively, the device 1200 may distribute portions of the aforementioned structure and/or operations across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, communication interface 1202 may include a component or combination of components adapted for transmitting and receiving communication messages over one or more wired or wireless interfaces according to one or more communication standard protocols. As an example, the communications interface 1202 may be a radio interface and may be include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. The communications interface 1202 may include, for example, a receiver 1206 and a transmitter 1208. As a radio interface, the communications interface 1202 may also include a frequency synthesizer 1210. As a radio interface, the communications interface 1202 may include bias controls, a crystal oscillator and/or one or more antennas 12111 (shown in phantom). In another embodiment as a radio interface, the communications interface 1202 may use external voltage-controlled oscillators (VCOs), surface acoustic wave filters, intermediate frequency (IF) filters and/or RF filters, as desired. Due to the variety of potential RF interface designs an expansive description thereof is omitted.

Circuitry 1204 may communicate with communications interface 1202 to process, receive and/or transmit signals. The circuitry 1204 may include an analog-to-digital converter (ADC) 1212 and a digital-to-analog converter (DAC) 1214. In some embodiments for the communications interface 1202 implemented as a radio interface, the ADC 1212 can be used for down converting received signals and the DAC 1214 can be used for up converting signals for transmission. The circuitry 1204 may include a baseband or physical layer (PHY) processing circuit 1216 for PHY link layer processing of respective receive/transmit signals. The circuitry 1204 may include, for example, a medium access control (MAC) processing circuit 1218 for MAC/data link layer processing. The circuitry 1204 may include a memory controller 1220 for communicating with MAC processing circuit 1218 and/or a computing platform 1228, for example, via one or more interfaces 1222.

In some embodiments, PHY processing circuit 1216 may include a frame construction and/or detection module, in combination with additional circuitry such as a buffer memory, to construct and/or deconstruct communication frames. Alternatively or in addition, MAC processing circuit 1218 may share processing for certain of these functions or perform these processes independent of PHY processing circuit 1216. In some embodiments, MAC and PHY processing may be integrated into a single circuit.

The computing platform 1228 may provide computing functionality for the device 1200. As shown, the computing platform 1228 may include a processing component 1230. In addition to, or alternatively of the circuitry 1204, the device 1200 may execute processing operations or logic for one or more of apparatus 500 and/or system 520 of FIG. 5, apparatus 600 and/or system 616 of FIG. 6, and apparatus 700 and/or system 720 of FIG. 7 and/or operations described for one or more of the message flows depicted in the message flow operating environments 200, 300, and 400 as described in relation to FIGS. 2-4, storage medium 1224, and logic circuit 1226 using the processing component 1230.

The processing component 1230 (and/or PHY 1216 and/or MAC 1218) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1228 may further include other platform components 1232. Other platform components 1232 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, eNB, PDN-GW, TWAG, eDPG, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1211-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
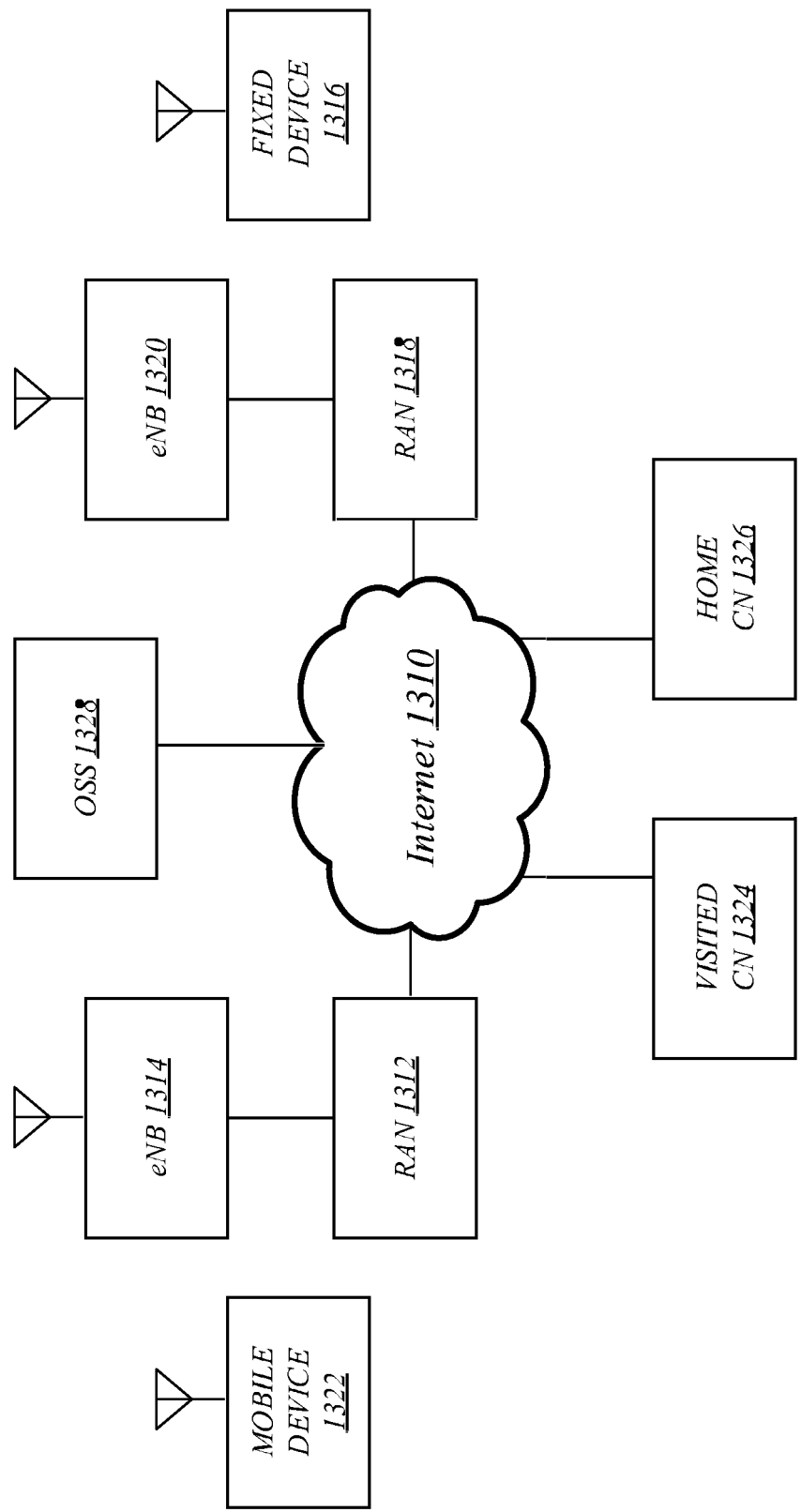
FIG. 13 illustrates an embodiment of a wireless network.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.13 Standards, and the scope of the claimed subject matter is not limited in these respects.

In the exemplary broadband wireless access system 1300, radio access networks (RANs) 1312 and 1318 are capable of coupling with evolved node Bs (eNBs) 1314 and 1320, respectively, to provide wireless communication between one or more fixed devices 1316 and internet 1310 and/or between or one or more mobile devices 1322 and Internet 1310. One example of a fixed device 1316 and a mobile device 1322 is device 1200 of FIG. 12, with the fixed device 1316 comprising a stationary version of device 1200 and the mobile device 1322 comprising a mobile version of device 1200. RANs 1312 and 1318 may implement profiles that are capable of defining the mapping of network functions to one or more physical entities on broadband wireless access system 1300. eNBs 1314 and 1320 may comprise radio equipment to provide RF communication with fixed device 1316 and/or mobile device 1322, such as described with reference to device 1200, and may comprise, for example, the PHY and MAC layer equipment in compliance with a 3GPP LTE Specification or an IEEE 802.13 Standard. eNBs 1314 and 1320 may further comprise an IP backplane to couple to Internet 1310 via RANs 1312 and 1318, respectively, although the scope of the claimed subject matter is not limited in these respects.

Broadband wireless access system 1300 may further comprise a visited core network (CN) 1324 and/or a home CN 1326, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1324 and/or home CN 1326, and the scope of the claimed subject matter is not limited in these respects. Visited CN 1324 may be referred to as a visited CN in the case where visited CN 1324 is not part of the regular service provider of fixed device 1316 or mobile device 1322, for example where fixed device 1316 or mobile device 1322 is roaming away from its respective home CN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322. The embodiments are not limited in this context.

Fixed device 1316 may be located anywhere within range of one or both of eNBs 1314 and 1320, such as in or near a home or business to provide home or business customer broadband access to Internet 1310 via eNBs 1314 and 1320 and RANs 1312 and 1318, respectively, and home CN 1326. It is worthy of note that although fixed device 1316 is generally disposed in a stationary location, it may be moved to different locations as needed. Mobile device 1322 may be utilized at one or more locations if mobile device 1322 is within range of one or both of eNBs 1314 and 1320, for example. In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following first set of examples pertain to further embodiments:

Example 1 is a user equipment (UE) comprising logic, at least a portion of which is in hardware, to generate a wireless local area network (WLAN) control protocol (WLCP) packet data network (PDN) connectivity request message indicating that an existing PDN connection is to be provisioned as a multiple access PDN connection by adding one of a WLAN and a 3GPP network as an additional access connection, a transceiver to transmit the WLCP PDN connectivity request message.

Example 2 is an extension of Example 1, the logic to indicate in a request type field of the WLCP PDN connectivity request message that the existing PDN connection is to be provisioned as the multiple access PDN connection and to specify one of the WLAN and the 3GPP network as the additional access connection.

Example 3 is an extension of Example 1, the logic to update a routing rule in the WLCP PDN connectivity request message.

Example 4 is an extension of Example 3, the logic to include a new routing rule in the WLCP PDN connectivity request message.

Example 5 is an extension of Example 4, the logic to include a new routing filter description for the new routing rule.

Example 6 is an extension of Example 4, the logic to modify a routing access type of an existing routing rule in the WLCP PDN connectivity request message.

Example 7 is an extension of Example 3, the logic to include the updated routing rule in a protocol configuration options (PCO) field of the WLCP PDN connectivity request message.

Example 8 is an extension of Example 1, wherein the WLAN is a trusted WLAN (TWAN).

Example 9 is a user equipment (UE) comprising logic, at least a portion of which is in hardware, to generate a wireless local area network (WLAN) control protocol (WLCP) flow mobility request message indicating that an internet protocol (IP) flow is to be moved from a first wireless access system to a second wireless access system, and a transceiver to transmit the WLCP flow mobility request message.

Example 10 is an extension of Example 9, wherein the first wireless access system is a 3GPP wireless access system and the second wireless access system is a non-3GPP wireless access system.

Example 11 is an extension of Example 9, wherein the first wireless access system is a non-3GPP wireless access system and the second wireless access system is a 3GPP wireless access system.

Example 12 is an extension of Example 9, the logic to identify at least one of a message type, a transaction identifier, an access point name, and a packet data network (PDN) connection identifier (ID) in the WLCP flow mobility request message.

Example 13 is an extension of Example 9, the logic to include an updated routing rule in the WLCP flow mobility request message.

Example 14 is an extension of Example 13, the logic include the updated routing rule in a protocol configuration options (PCO) field of the WLCP flow mobility request message.

Example 15 is an extension of Example 9, the logic to process an indication provided in a WLCP flow mobility indication message that a second IP flow is to be moved from the first wireless access system to the second wireless access system and to process a second updated routing rule included in a PCO field of the WLCP flow mobility indication, and a receiver to receive the WLCP flow mobility indication message.

Example 16 is a wireless local area network (WLAN) gateway, comprising logic, at least a portion of which is in hardware, to generate one of a bearer resource command and a modify bearer request message indicating that an IP flow is to be moved from a first wireless access system to a second wireless access system and to include an updated routing rule for the IP flow in a protocol configuration options (PCO) field in the one of the bearer resource command and the modify bearer request message, and a transmitter to transmit the one of the bearer resource command and the modify bearer request message.

Example 17 is an extension of Example 17, the logic to process an indication provided in an update bearer request message that a second IP flow is to be moved from the first wireless access system to the second wireless access system and to process a second updated routing rule included in the PCO field of the update bearer request message, and a receiver to receive the update bearer request message.

Example 18 is an extension of Example 17, the logic to generate an update bearer response message indicating acknowledgement that the second IP flow is to be moved from the first wireless access system to the second wireless access system and to include the second updated routing rule in the PCO field of the update bearer response message.

Example 19 is an extension of Example 16, wherein the WLAN gateway is a trusted WLAN gateway (TWAG).

Example 20 is a packet data network gateway (PDN-GW) comprising logic, at least a portion of which is in hardware, to process a rule for managing internet protocol (IP) flows associated with the PDN-GW, to generate an update bearer request message indicating that an IP flow is to be moved from a first wireless access system to a second wireless access system based on the processed rule, and to include an updated routing rule in the update bearer request message.

Example 21 is an extension of Example 20, the logic to process the rule for managing IP flows based on an indication from an access network discovery and select function (ANDSF).

Example 22 is an extension of Example 20, the logic to include the updated routing rule in a protocol configuration options (PCO) field of the update bearer request message.

Example 23 is an extension of Example 20, the logic to process an update bearer response message indicating acknowledgement that the IP flow is to be moved from the first wireless access system to the second wireless access system and to process the updated routing rule included in the PCO field of the update bearer response message.

Example 24 is an extension of Example 20, the logic to process one of a bearer resource command and a modify bearer request message indicating that a second IP flow is to be moved from the first wireless access system to the second wireless access system and to process a second updated routing rule for the second IP flow included in the PCO field in the one of the bearer resource command and the modify bearer request message.

Example 25 is an extension of Example 24, the logic to generate one of a bearer resource command and a modify bearer response message indicating acknowledgement that the second IP flow is to be moved from the first wireless access system to the second wireless access system and to include the second updated routing rule for the second IP flow in the PCO field in the one of the bearer resource command and the modify bearer response message.

The following second set of examples pertain to further embodiments:

Example 1 is a user equipment (UE) comprising logic, at least a portion of which is in hardware, to generate a wireless local area network (WLAN) control protocol (WLCP) packet data network (PDN) connectivity request message indicating that an existing PDN connection is to be provisioned as a multiple access PDN connection by adding one of a WLAN and a 3GPP network as an additional access connection, and a transceiver to transmit the WLCP PDN connectivity request message.

Example 2 is an extension of Example 1, the logic to indicate in a request type field of the WLCP PDN connectivity request message that the existing PDN connection is to be provisioned as the multiple access PDN connection and to specify one of the WLAN and the 3GPP network as the additional access connection.

Example 3 is an extension of any of Examples 1 to 2, the logic to update a routing rule in the WLCP PDN connectivity request message.

Example 4 is an extension of any of Examples 1 to 3, the logic to include a new routing rule in the WLCP PDN connectivity request message.

Example 5 is an extension of any of Example 4, the logic to include a new routing filter description for the new routing rule.

Example 6 is an extension of any of Examples 1 to 5, the logic to modify a routing access type of an existing routing rule in the WLCP PDN connectivity request message.

Example 7 is an extension of any of Example 3, the logic to include the updated routing rule in a protocol configuration options (PCO) field of the WLCP PDN connectivity request message.

Example 8 is an extension of any of Examples 1 to 7, the logic to generate a WLCP flow mobility request message indicating that an internet protocol (IP) flow is to be moved from a first wireless access system to a second wireless access system.

Example 9 is an extension of any of Example 8, wherein the first wireless access system is a 3GPP wireless access system and the second wireless access system is a non-3GPP wireless access system.

Example 10 is an extension of any of Example 8, wherein the first wireless access system is a non-3GPP wireless access system and the second wireless access system is a 3GPP wireless access system.

Example 11 is an extension of any of Examples 8 to 10, the logic to identify at least one of a message type, a transaction identifier, an access point name, and a packet data network (PDN) connection identifier (ID) in the WLCP flow mobility request message.

Example 12 is an extension of any of Examples 8 to 10, the logic to include an updated routing rule in the WLCP flow mobility request message.

Example 13 is an extension of any of Example 12, the logic include the updated routing rule in a protocol configuration options (PCO) field of the WLCP flow mobility request message.

Example 14 is an extension of any of Examples 8 to 13, the logic to initiate generation of the WLCP flow mobility request message based on a flow mobility trigger.

Example 15 is an extension of any of Example 14, wherein the flow mobility trigger is based on one of a routing rule, a received signal strength, an available bandwidth, a quality of service (QoS) requirement, a user input, and a user preference.

The following third set of examples pertain to further embodiments:

Example 1 is a user equipment (UE), comprising logic, at least a portion of which is in hardware, to generate a wireless local area network (WLAN) control protocol (WLCP) packet data network (PDN) connectivity request message indicating that an existing PDN connection is to be used to provide access to a trusted WLAN access network (TWAN) and a transceiver to transmit the WLCP PDN connectivity request message.

Example 2 is an extension of Example 1, the logic to indicate that the existing PDN connection is to be used to provide access to the TWAN using a request type field of the WLCP PDN connectivity request message.

Example 3 is an extension of Example 2, the logic to set the request type field of the WLCP PDN connectivity request message to internet protocol (IP) flow mobility.

Example 4 is an extension of Example 1, the logic to identify the TWAN.

Example 5 is an extension of Example 1, the logic to update a routing rule in the WLCP PDN connectivity request message.

Example 6 is an extension of Example 5, the logic to include a new routing rule in the WLCP PDN connectivity request message.

Example 7 is an extension of Example 6, the logic to include a new routing filter description for the new routing rule.

Example 8 is an extension of Example 5, the logic to modify a routing access type of an existing routing rule in the WLCP PDN connectivity request message.

Example 9 is an extension of Example 5, the logic to remove an existing routing rule.

Example 10 is an extension of Example 5, the logic to include the updated routing rule in a protocol configuration options (PCO) field of the WLCP PDN connectivity request message.

Example 11 is a system comprising a UE according to any of Examples 1 to 10, one or more radio frequency (RF) antennas, and a display.

Example 12 is a wireless communication method, comprising identifying a trusted wireless local area network (WLAN) access network (TWAN), generating a WLAN control protocol (WLCP) packet data network (PDN) connectivity request message indicating that an existing PDN connection is to be used to provide access to the TWAN, and transmitting the WLCP PDN connectivity request message.

Example 13 is an extension of Example 12, further comprising using a request type field of the WLCP PDN connectivity request message to indicate that the existing PDN connection is to be used to provide access to the TWAN.

Example 14 is an extension of Example 13, further comprising setting the request type field of the WLCP PDN connectivity request message to internet protocol (IP) flow mobility.

Example 15 is an extension of Example 12, wherein generating further comprises including an updated routing rule in the WLCP PDN connectivity request message.

Example 16 is an extension of Example 15, further comprising including a new routing rule in the WLCP PDN connectivity request message.

Example 17 is an extension of Example 16, further comprising including a new routing filter description for the new routing rule.

Example 18 is an extension of Example 15, further comprising modifying a routing access type of an existing routing rule in the WLCP PDN connectivity request message.

Example 19 is an extension of Example 15, further comprising removing an existing routing rule.

Example 20 is an extension of Example 15, further comprising including the updated routing rule in a protocol configuration options (PCO) field of the WLCP PDN connectivity request message.

Example 21 is at least one non-transitory computer-readable storage medium comprising a set of instructions that, in response to being executed on a computing device, cause the computing device to perform a wireless communication method according to any of Examples 11 to 20.

Example 22 is an apparatus comprising means for performing a wireless communication method according to any of Examples 11 to 20.

Example 23 is at least one non-transitory computer-readable storage medium comprising a set of wireless communication instructions that, in response to being executed at user equipment (UE), cause the UE to identify a trusted wireless local area network (WLAN) access network (TWAN), generate a WLAN control protocol (WLCP) packet data network (PDN) connectivity request message indicating that an existing PDN connection is to be used to provide access to the TWAN, and transmit the WLCP PDN connectivity request message.

Example 24 is an extension of Example 23, comprising wireless communication instructions that, in response to being executed at the UE, cause the UE to use a request type field of the WLCP PDN connectivity request message to indicate that the existing PDN connection is to be used to provide access to the TWAN.

Example 25 is an extension of Example 24, comprising wireless communication instructions that, in response to being executed at the UE, cause the UE to set the request type field of the WLCP PDN connectivity request message to internet protocol (IP) flow mobility.

Example 26 is an extension of Example 23, comprising wireless communication instructions that, in response to being executed at the UE, cause the UE to include an updated routing rule in the WLCP PDN connectivity request message.

Example 27 is an extension of Example 26, comprising wireless communication instructions that, in response to being executed at the UE, cause the UE to include a new routing rule in the WLCP PDN connectivity request message.

Example 28 is an extension of Example 27, comprising wireless communication instructions that, in response to being executed at the UE, cause the UE to include a new routing filter description for the new routing rule.

Example 29 is an extension of Example 26, comprising wireless communication instructions that, in response to being executed at the UE, cause the UE to modify a routing access type of an existing routing rule in the WLCP PDN connectivity request message.

Example 30 is an extension of Example 26, comprising wireless communication instructions that, in response to being executed at the UE, cause the UE to remove an existing routing rule.

Example 31 is an extension of Example 26, comprising wireless communication instructions that, in response to being executed at the UE, cause the UE to include the updated routing rule in a protocol configuration options (PCO) field of the WLCP PDN connectivity request message.

Example 32 is a user equipment (UE), comprising logic, at least a portion of which is in hardware, to generate a wireless local area network (WLAN) control protocol (WLCP) flow mobility request message indicating that an internet protocol (IP) flow is to be moved from a first wireless access system to a second wireless access system and a transceiver to transmit the WLCP flow mobility request message.

Example 33 is an extension of Example 32, wherein the first wireless access system is a 3GPP wireless access system and the second wireless access system is a non-3GPP wireless access system.

Example 34 is an extension of Example 32, wherein the first wireless access system is a non-3GPP wireless access system and the second wireless access system is a 3GPP wireless access system.

Example 35 is an extension of Example 32, the logic to identify at least one of a message type, a transaction identifier, an access point name, and a packet data network (PDN) connection identifier (ID) in the WLCP flow mobility request message.

Example 36 is an extension of Example 32, the logic to identify the IP flow in the WLCP flow mobility request message.

Example 37 is an extension of Example 32, the logic to include an updated routing rule in the WLCP flow mobility request message.

Example 38 is an extension of Example 37, the logic include the updated routing rule in a protocol configuration options (PCO) field of the WLCP flow mobility request message.

Example 39 is an extension of Example 32, the logic to initiate generation of the WLCP flow mobility request message based on a flow mobility trigger.

Example 40 is an extension of Example 39, wherein the flow mobility trigger is based on one of a routing rule, a received signal strength, an available bandwidth, a quality of service (QoS) requirement, a user input, and a user preference.

Example 41 is a system comprising a UE according to any of Examples 32 to 40, one or more radio frequency (RF) antennas, and a display.

Example 42 is a wireless communication method, comprising generating a wireless local area network (WLAN) control protocol (WLCP) flow mobility request message indicating that an internet protocol (IP) flow is to be moved from a first wireless access system to a second wireless access system and transmitting the WLCP flow mobility request message.

Example 43 is an extension of Example 42, wherein the first wireless access system is a 3GPP wireless access system and the second wireless access system is a non-3GPP wireless access system.

Example 44 is an extension of Example 42, wherein the first wireless access system is a non-3GPP wireless access system and the second wireless access system is a 3GPP wireless access system.

Example 45 is an extension of Example 42, further comprising identifying at least one of a message type, a transaction identifier, an access point name, and a packet data network (PDN) connection identifier (ID) in the WLCP flow mobility request message.

Example 46 is an extension of Example 42, further comprising identifying the IP flow in the WLCP flow mobility request message.

Example 47 is an extension of Example 46, further comprising including an updated routing rule in the WLCP flow mobility request message.

Example 48 is an extension of Example 47, further comprising including the updated routing rule in a protocol configuration options (PCO) field of the WLCP flow mobility request message.

Example 49 is an extension of Example 42, further comprising initiating generation of the WLCP flow mobility request message based on a flow mobility trigger.

Example 50 is an extension of Example 49, wherein the flow mobility trigger is based on one of a routing rule, a received signal strength, an available bandwidth, a quality of service (QoS) requirement, a user input, and a user preference.

Example 51 is at least one non-transitory computer-readable storage medium comprising a set of instructions that, in response to being executed on a computing device, cause the computing device to perform a wireless communication method according to any of Examples 42 to 50.

Example 52 is an apparatus, comprising means for performing a wireless communication method according to any of Examples 42 to 50.

Example 53 is at least one non-transitory computer-readable storage medium comprising a set of wireless communication instructions that, in response to being executed at user equipment (UE), cause the UE to generate a wireless local area network (WLAN) control protocol (WLCP) flow mobility request message indicating that an internet protocol (IP) flow is to be moved from a first wireless access system to a second wireless access system and transmit the WLCP flow mobility request message.

Example 54 is an extension of Example 53, wherein the first wireless access system is a 3GPP wireless access system and the second wireless access system is a non-3GPP wireless access system.

Example 55 is an extension of Example 53, wherein the first wireless access system is a non-3GPP wireless access system and the second wireless access system is a 3GPP wireless access system.

Example 56 is an extension of Example 53, comprising wireless communication instructions that, in response to being executed at the UE, cause the UE to identify at least one of a message type, a transaction identifier, an access point name, and a packet data network (PDN) connection identifier (ID) in the WLCP flow mobility request message.

Example 57 is an extension of Example 53, comprising wireless communication instructions that, in response to being executed at the UE, cause the UE to identify the IP flow in the WLCP flow mobility request message.

Example 58 is an extension of Example 53, comprising wireless communication instructions that, in response to being executed at the UE, cause the UE to include an updated routing rule in the WLCP flow mobility request message.

Example 59 is an extension of Example 58, comprising wireless communication instructions that, in response to being executed at the UE, cause the UE to include the updated routing rule in a protocol configuration options (PCO) field of the WLCP flow mobility request message.

Example 60 is an extension of Example 53, comprising wireless communication instructions that, in response to being executed at the UE, cause the UE to initiate generation of the WLCP flow mobility request message based on a flow mobility trigger.

Example 61 is an extension of Example 60, wherein the flow mobility trigger is based on one of a routing rule, a received signal strength, an available bandwidth, a quality of service (QoS) requirement, a user input, and a user preference.

Example 62 is a packet data network gateway (PDN-GW) comprising logic, at least a portion of which is in hardware, to provision a rule for managing internet protocol (IP) flows associated with the PDN-GW and to generate an update bearer request message indicating that an IP flow is to be moved from a first wireless access system to a second wireless access system based on the provisioned rule.

Example 63 is an extension of Example 62, wherein the first wireless access system is a 3GPP wireless access system and the second wireless access system is a non-3GPP wireless access system.

Example 64 is an extension of Example 62, wherein the first wireless access system is a non-3GPP wireless access system and the second wireless access system is a 3GPP wireless access system.

Example 65 is an extension of Example 62, the logic to receive the rule for managing IP flows from an access network discovery and select function (ANDSF).

Example 66 is an extension of Example 62, the logic to receive the rule for managing IP flows from an evolved node B (eNB).

Example 67 is an extension of Example 62, the logic to receive the rule for managing IP flows locally.

Example 68 is an extension of Example 62, the logic to include an updated routing rule in the update bearer request message.

Example 69 is an extension of Example 68, the logic to include the updated routing rule directly in the update bearer request message.

Example 70 is an extension of Example 68, the logic to include the updated routing rule in a protocol configuration options (PCO) field of the update bearer request message.

Example 71 is an extension of Example 62, the logic to dynamically adjust the provisioned rule based on at least of network congestion, user subscription profile, and a quality of service (QoS) requirement.

Example 72 is a system, comprising a PDN-GW according to any of Examples 62 to 71 and a transceiver to transmit the update bearer request message.

Example 73 is a communication method, comprising provisioning a rule for managing internet protocol (IP) flows associated with a packet data network gateway (PDN-GW), generating an update bearer request message indicating that an IP flow is to be moved from a first wireless access system to a second wireless access system based on the provisioned rule, and transmitting the update bearer request message.

Example 74 is an extension of Example 73, wherein the first wireless access system is a 3GPP wireless access system and the second wireless access system is a non-3GPP wireless access system.

Example 75 is an extension of Example 73, wherein the first wireless access system is a non-3GPP wireless access system and the second wireless access system is a 3GPP wireless access system.

Example 76 is an extension of Example 73, further comprising receiving the rule for managing IP flows from an access network discovery and select function (ANDSF).

Example 77 is an extension of Example 73, further comprising receiving the rule for managing IP flows from an evolved node B (eNB).

Example 78 is an extension of Example 73, further comprising receiving the rule for managing IP flows locally.

Example 79 is an extension of Example 73, further comprising including an updated routing rule in the update bearer request message.

Example 80 is an extension of Example 79, further comprising including the updated routing rule directly in the update bearer request message.

Example 81 is an extension of Example 79, further comprising including the updated routing rule in a protocol configuration options (PCO) field of the update bearer request message.

Example 82 is an extension of Example 73, further comprising dynamically adjusting the provisioned rule based on at least of network congestion, user subscription profile, and a quality of service (QoS) requirement.

Example 83 is at least one non-transitory computer-readable storage medium comprising a set of instructions that, in response to being executed on a computing device, cause the computing device to perform a communication method according to any of Examples 73 to 82.

Example 84 is an apparatus comprising means for performing a communication method according to any of Examples 73 to 82.

Example 85 is an at least one non-transitory computer-readable storage medium comprising a set of communication instructions that, in response to being executed at a packet data network gateway (PDN-GW), cause the PDN-GW to provision a rule for managing internet protocol (IP) flows associated with the PDN-GW, generate an update bearer request message indicating that an IP flow is to be moved from a first wireless access system to a second wireless access system based on the provisioned rule and transmit the update bearer request message.

Example 86 is an extension of Example 85, wherein the first wireless access system is a 3GPP wireless access system and the second wireless access system is a non-3GPP wireless access system.

Example 87 is an extension of Example 85, wherein the first wireless access system is a non-3GPP wireless access system and the second wireless access system is a 3GPP wireless access system.

Example 88 is an extension of Example 85, comprising communication instructions that, in response to being executed at the PDN-GW, cause the PDN-GW to receive the rule for managing IP flows from an access network discovery and select function (ANDSF).

Example 89 is an extension of Example 85, comprising communication instructions that, in response to being executed at the PDN-GW, cause the PDN-GW to receive the rule for managing IP flows from an evolved node B (eNB).

Example 90 is an extension of Example 85, comprising communication instructions that, in response to being executed at the PDN-GW, cause the PDN-GW to receive the rule for managing IP flows locally.

Example 91 is an extension of Example 85, comprising communication instructions that, in response to being executed at the PDN-GW, cause the PDN-GW to include an updated routing rule in the update bearer request message.

Example 92 is an extension of Example 91, comprising communication instructions that, in response to being executed at the PDN-GW, cause the PDN-GW to include the updated routing rule directly in the update bearer request message.

Example 93 is an extension of Example 91, comprising communication instructions that, in response to being executed at the PDN-GW, cause the PDN-GW to include the updated routing rule in a protocol configuration options (PCO) field of the update bearer request message.

Example 94 is an extension of Example 85, comprising communication instructions that, in response to being executed at the PDN-GW, cause the PDN-GW to dynamically adjust the provisioned rule based on at least of network congestion, user subscription profile, and a quality of service (QoS) requirement.

Example 95 is a user equipment (UE), comprising logic, at least a portion of which is in hardware, to process an indication that an internet protocol (IP) flow is to be moved from a first wireless access system to a second wireless access system and to process an updated routing rule.

Example 96 is an extension of Example 95, wherein the first wireless access system is a 3GPP wireless access system and the second wireless access system is a non-3GPP wireless access system.

Example 97 is an extension of Example 95, wherein the first wireless access system is a non-3GPP wireless access system and the second wireless access system is a 3GPP wireless access system.

Example 98 is an extension of Example 95, wherein the indication is based on a received wireless local area network (WLAN) control protocol (WLCP) flow mobility indication message.

Example 99 is an extension of Example 98, wherein the WLCP flow mobility indication message further comprises at least one of a message type, a transaction identifier, an access point name, and a packet data network (PDN) connection identifier (ID) in the WLCP flow mobility request message.

Example 100 is an extension of Example 98, wherein the WLCP flow mobility indication message further comprises an identity of the IP flow.

Example 101 is an extension of Example 98, wherein the WLCP flow mobility indication message further comprises the updated routing rule.

Example 102 is an extension of Example 98, wherein the updated routing rule is included in a protocol configuration options (PCO) field of the WLCP flow mobility indication.

Example 103 is an extension of Example 95, further comprising a transceiver to receive the indication and the updated routing rule.

Example 104 is an extension of Example 95, the logic to generate a WLCP flow mobility response message indicating acknowledgement that the IP flow is to be moved from the first wireless access system to the second wireless access system and the updated routing rule.

Example 105 is an extension of Example 104, the logic to include the updated routing rule in a protocol configuration options (PCO) field of the WLCP flow mobility response message.

Example 106 is an extension of Example 105, further comprising a transceiver to transmit the WLCP flow mobility response message.

Example 107 is a system comprising a UE according to any of Examples 95 to 106, one or more radio frequency (RF) antennas, and a display.

Example 108 is a packet data network gateway (PDN-GW) comprising logic, at least a portion of which is in hardware, to determine that all internet protocol (IP) flows associated with a user equipment (UE) are on a non-3GPP wireless access system and to determine if the UE is to be detached from a 3GPP wireless access system.

Example 109 is an extension of Example 108, the logic to determine if the UE is to be detached from the 3GPP wireless access system based on at least one of a configuration preference set by an operator of the PDN-GW, traffic conditions on the 3GPP wireless access system, and a type of IP flow associated with the UE.

Example 110 is an extension of Example 109, the logic to override implementation of a detach procedure to maintain a connection on the 3GPP wireless access system for the UE.

Example 111 is an extension of Example 108, the logic to determine that the UE is to be detached from the 3GPP wireless access system when the logic determines that a set period of time has elapsed.

Example 112 is an extension of Example 111, the logic to measure the set period of time substantially starting from a time when the logic determines that all IP flows associated with the UE are on the non-3GPP wireless access system.

Example 113 is system comprising a PDN-GW according to any of claims 108 to 112 and a transceiver.

Example 114 is a communication method, comprising determining that all internet protocol (IP) flows associated with a user equipment (UE) are on a non-3GPP wireless access system, determining if the UE is to be detached from a 3GPP wireless access system, and implementing a detach procedure to remove a connection on the 3GPP wireless access system for the UE if it is determined to detach the UE and overriding implementation of the detach procedure to maintain the connection on the 3GPP wireless access system for the UE if it is determined to not detach the UE.

Example 115 is an extension of Example 114, wherein determining if the UE is to be detached is based on at least one of a configuration preference set by an operator of the PDN-GW, traffic conditions on the 3GPP wireless access system, and a type of IP flow associated with the UE.

Example 116 is an extension of Example 114, further comprising implementing the detach procedure upon expiration of a timer.

Example 117 is an extension of Example 116, further comprising initiating the timer at substantially a same time it is determined that all IP flows associated with the UE are on the non-3GPP wireless access system.

Example 118 is at least one non-transitory computer-readable storage medium comprising a set of instructions that, in response to being executed on a computing device, cause the computing device to perform a communication method according to any of Examples 114 to 117.

Example 119 is an apparatus comprising means for performing a communication method according to any of Examples 114 to 117.

Example 120 is at least one non-transitory computer-readable storage medium comprising a set of communication instructions that, in response to being executed at a packet data network gateway (PDN-GW), cause the PDN-GW to determine that all internet protocol (IP) flows associated with a user equipment (UE) are on a non-3GPP wireless access system, determine if the UE is to be detached from a 3GPP wireless access system, and implement a detach procedure to remove a connection on the 3GPP wireless access system for the UE if it is determined to detach the UE and overriding implementation of the detach procedure to maintain the connection on the 3GPP wireless access system for the UE if it is determined to not detach the UE.

Example 121 is an extension of Example 120, comprising communication instructions that, in response to being executed at the PDN-GW, cause the PDN-GW to determine if the UE is to be detached based on at least one of a configuration preference set by an operator of the PDN-GW, traffic conditions on the 3GPP wireless access system, and a type of IP flow associated with the UE.

Example 122 is an extension of Example 121, comprising communication instructions that, in response to being executed at the PDN-GW, cause the PDN-GW to implement the detach procedure upon expiration of a timer.

Example 123 is an extension of Example 122, comprising communication instructions that, in response to being executed at the PDN-GW, cause the PDN-GW to initiate the timer at substantially a same time it is determined that all IP flows associated with the UE are on the non-3GPP wireless access system.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
   radio frequency (RF) circuitry; and
   baseband circuitry coupled to the RF circuitry, the baseband circuitry to:
     generate a wireless local area network (WLAN) control protocol (WLCP) packet data network (PDN) connectivity request message;
     indicate, via the WLCP PDN connectivity request message, that an existing PDN connection is to be provisioned as a multiple access PDN connection by adding one of a WLAN or a $3^{rd}$ generation partnership project (3GPP) network as an additional access connection;
     generate a WLCP network-based IP flow mobility (NBIFOM) request message to include an indication of an updated routing rule;
     include a new routing filter description for the updated routing rule in the WLCP NBIFOM message flow; and
     transmit the WLCP PDN connectivity request message via the RF circuitry.

2. The UE of claim 1, the baseband circuitry to indicate in a request type field of the WLCP PDN connectivity request message that the existing PDN connection is to be provisioned as the multiple access PDN connection and to specify one of the WLAN or the 3GPP network as the additional access connection.

3. The UE of claim 1, the baseband circuitry to update a routing rule in the WLCP PDN connectivity request message.

4. The UE of claim 1, the baseband circuitry to modify a routing access type of an existing routing rule in the WLCP PDN connectivity request message.

5. The UE of claim 1, wherein the WLAN is a trusted WLAN (TWAN).

6. The UE of claim 1, comprising an application processor.

7. The UE of claim 6, comprising one or more RF antennas.

8. The UE of claim 1, wherein the WLCP NBIFOM request message flow comprises a bearer resource command.

9. An apparatus for user equipment, comprising:
   circuitry to:
     generate a wireless local area network (WLAN) control protocol (WLCP) packet data network (PDN) connectivity request message indicating that an existing PDN connection is to be provisioned as a multiple access PDN connection by adding one of a WLAN or a 3$^{rd}$ generation partnership project (3GPP) network as an additional access connection,
generate a WLCP network-based IP flow mobility (NBIFOM) request message to include an indication of an updated routing rule, and
include a new routing filter description for the updated routing rule in the WLCP NBIFOM message flow; and
a transceiver coupled to the circuitry to transmit the WLCP PDN connectivity request message.

10. The apparatus of claim 9, the circuitry to indicate in a request type field of the WLCP PDN connectivity request message that the existing PDN connection is to be provisioned as the multiple access PDN connection and to specify one of the WLAN or the 3GPP network as the additional access connection.

11. The apparatus of claim 9, the circuitry to update a routing rule in the WLCP PDN connectivity request message.

12. The apparatus of claim 9, the circuitry to modify a routing access type of an existing routing rule in the WLCP PDN connectivity request message.

13. The apparatus of claim 9, wherein the WLAN is a trusted WLAN (TWAN).

14. The apparatus of claim 9, the circuitry comprising a baseband processor and an application processor.

15. The apparatus of claim 14, the transceiver comprising at least one radio frequency (RF) antenna and RF circuitry.

16. The apparatus of claim 9, wherein the WLCP NBIFOM request message flow comprises a bearer resource command.

17. At least one computer-readable storage medium having stored thereon instructions that, when executed by processing circuitry of user equipment (UE), cause the UE to:
generate a wireless local area network (WLAN) control protocol (WLCP) packet data network (PDN) connectivity request message indicating that an existing PDN connection is to be provisioned as a multiple access PDN connection by adding one of a WLAN or a 3$^{rd}$ generation partnership project (3GPP) network as an additional access connection;
generate a WLCP network-based IP flow mobility (NBIFOM) request message to include an indication of an updated routing rule;
include a new routing filter description for the updated routing rule in the WLCP NBIFOM request message flow; and
transmit the WLCP PDN connectivity request message via radio frequency (RF) circuitry.

18. The at least one computer-readable storage medium of claim of claim 17, the instructions, when executed by the processing circuitry cause the UE to indicate in a request type field of the WLCP PDN connectivity request message that the existing PDN connection is to be provisioned as the multiple access PDN connection and to specify one of the WLAN or the 3GPP network as the additional access connection.

19. The at least one computer-readable storage medium of claim of claim 17, the instructions, when executed by the processing circuitry cause the UE to update a routing rule in the WLCP PDN connectivity request message.

20. The at least one computer-readable storage medium of claim of claim 17, the instructions, when executed by the processing circuitry cause the UE to modify a routing access type of an existing routing rule in the WLCP PDN connectivity request message.

21. The at least one computer-readable storage medium of claim of claim 17, wherein the WLAN is a trusted WLAN (TWAN).

22. The at least one computer-readable storage medium of claim of claim 17, wherein the WLCP NBIFOM request message flow comprises a bearer resource command.

* * * * *